US009423924B2

(12) United States Patent
Jeon et al.

(10) Patent No.: US 9,423,924 B2
(45) Date of Patent: Aug. 23, 2016

(54) METHOD AND SYSTEM FOR CONTROLLING DISPLAY DEVICE AND COMPUTER-READABLE RECORDING MEDIUM

(71) Applicant: SAMSUNG ELECTRONICS CO., LTD., Suwon-si (KR)

(72) Inventors: Byung-jeong Jeon, Ansan-si (KR); Youn-gun Jung, Yongin-si (KR); In-young Shin, Seoul (KR); Hye-young Jun, Hwaseong-si (KR); Sun Choi, Suwon-si (KR); Won-jong Choi, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 227 days.

(21) Appl. No.: 13/858,295

(22) Filed: Apr. 8, 2013

(65) Prior Publication Data
US 2013/0268894 A1 Oct. 10, 2013

(30) Foreign Application Priority Data

Apr. 7, 2012 (KR) .................... 10-2012-0036403
Apr. 3, 2013 (KR) .................... 10-2013-0036173

(51) Int. Cl.
*G06F 3/0481* (2013.01)
*G06F 9/44* (2006.01)
*H04N 7/18* (2006.01)

(52) U.S. Cl.
CPC .......... *G06F 3/04817* (2013.01); *G06F 9/4445* (2013.01); *H04N 7/183* (2013.01)

(58) Field of Classification Search
CPC ..................... G06F 3/04817; G06F 3/0481
USPC ............................................. 715/835
See application file for complete search history.

(56) References Cited

U.S. PATENT DOCUMENTS 8,887,052 B1 * 11/2014 Young ................ 715/732
2006/0288306 A1 12/2006 Mahajan et al.
(Continued)

OTHER PUBLICATIONS

Communication dated May 19, 2014 issued by the Australian Patent Office in counterpart Australian Patent Application No. 2013203016.
(Continued)

*Primary Examiner* — Andrea Leggett
(74) *Attorney, Agent, or Firm* — Sughrue Mion, PLLC

(57) ABSTRACT

A portable device and a method for controlling a display device include receiving first display information of a first arrangement of icons displayed on a screen of the display device, displaying the first arrangement of icons on a display of a portable device based on the first display information, modifying the first arrangement of icons displayed on the display of the portable device to generate a second arrangement of icons, generating second display information based on the second arrangement of icons, and transmitting to the display device a request to display the second arrangement of icons on the display of the display device, the request comprising the second display information.

27 Claims, 23 Drawing Sheets

(56) References Cited

U.S. PATENT DOCUMENTS

| | | |
|---|---|---|
| 2008/0248834 A1 | 10/2008 | Chatterjee et al. |
| 2009/0132942 A1 | 5/2009 | Santoro et al. |
| 2010/0067866 A1 | 3/2010 | Park et al. |
| 2010/0223563 A1 | 9/2010 | Green |
| 2011/0047474 A1 | 2/2011 | Sung et al. |
| 2012/0042272 A1 | 2/2012 | Hong et al. |
| 2012/0075204 A1 | 3/2012 | Murray et al. |
| 2012/0081299 A1* | 4/2012 | Xiao et al. .................. 345/173 |
| 2012/0081383 A1 | 4/2012 | Reeves et al. |
| 2012/0240159 A1* | 9/2012 | Pan .................. H04N 21/2668 725/34 |
| 2013/0080935 A1* | 3/2013 | Reeves .................. G06F 3/1438 715/761 |

OTHER PUBLICATIONS

Communication dated Jul. 3, 2013 issued by the European Patent Office in counterpart European Application No. 13162578.2.

International Search Report dated Jul. 18, 2013 from the International Searching Authority in counterpart Application No. PCT/KR2013/002906.

Anonymous, "Undo", Apr. 2, 2012, Wikipedia, XP055266586, Retrieved from the Internet: URL:https://en.wikipedia.org/w/index.php?title=Undo&oldid=485085013 (retrieved on Apr. 19, 2016).

Communication from the European Patent Office issued Apr. 22, 2016 in counterpart European Application No. 13162578.2.

* cited by examiner

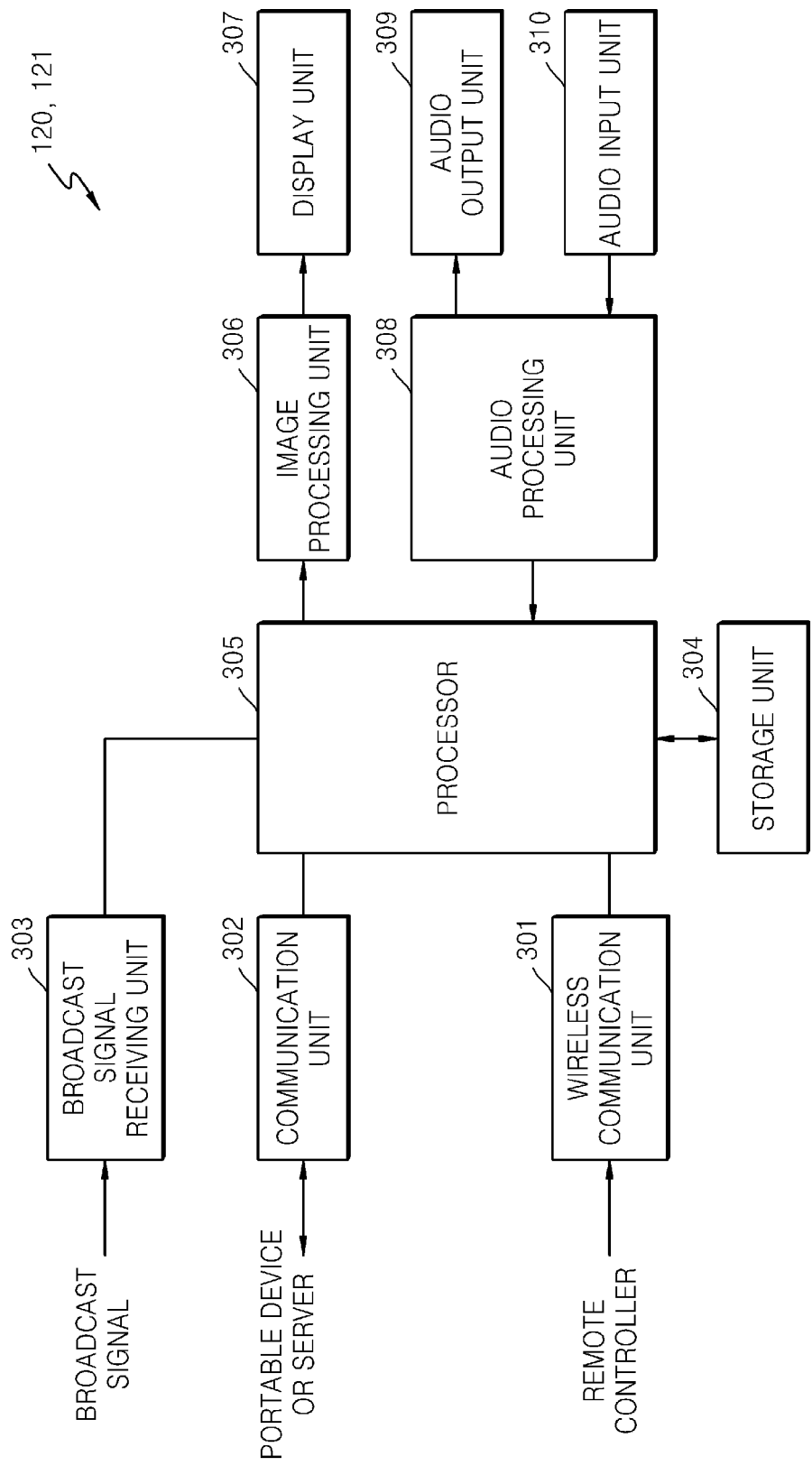

FIG. 5A
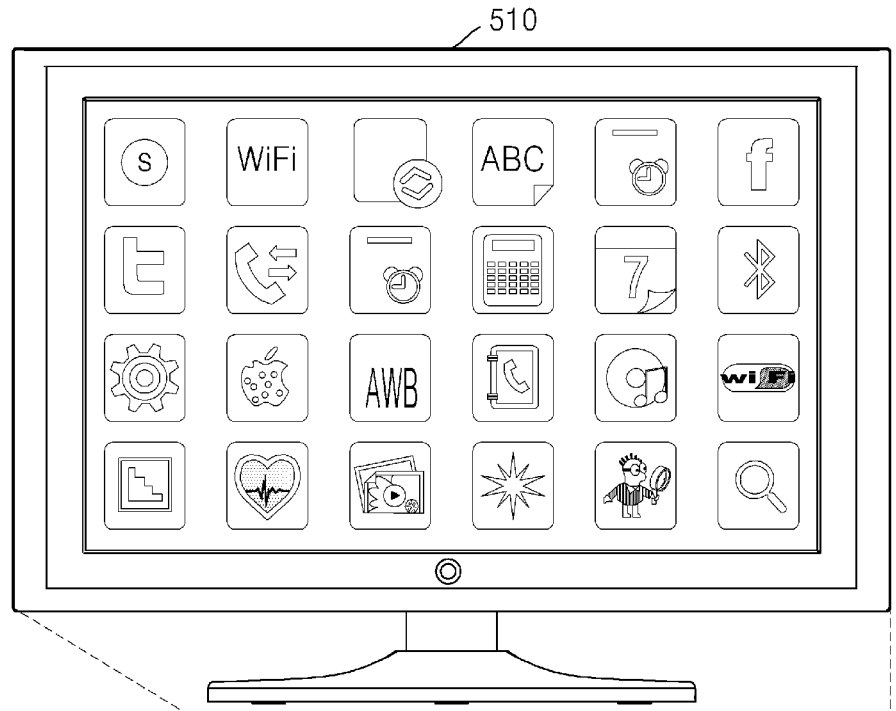
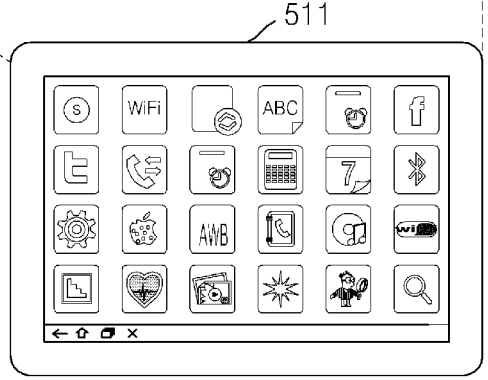
```
<object id="2">
    <object_position>
        <object_x-position="75">
        <object_y-position="246"></object_position>
    <object_icon>object.icon</object_icon>
    ...
</object>
```

SELECT ERASE

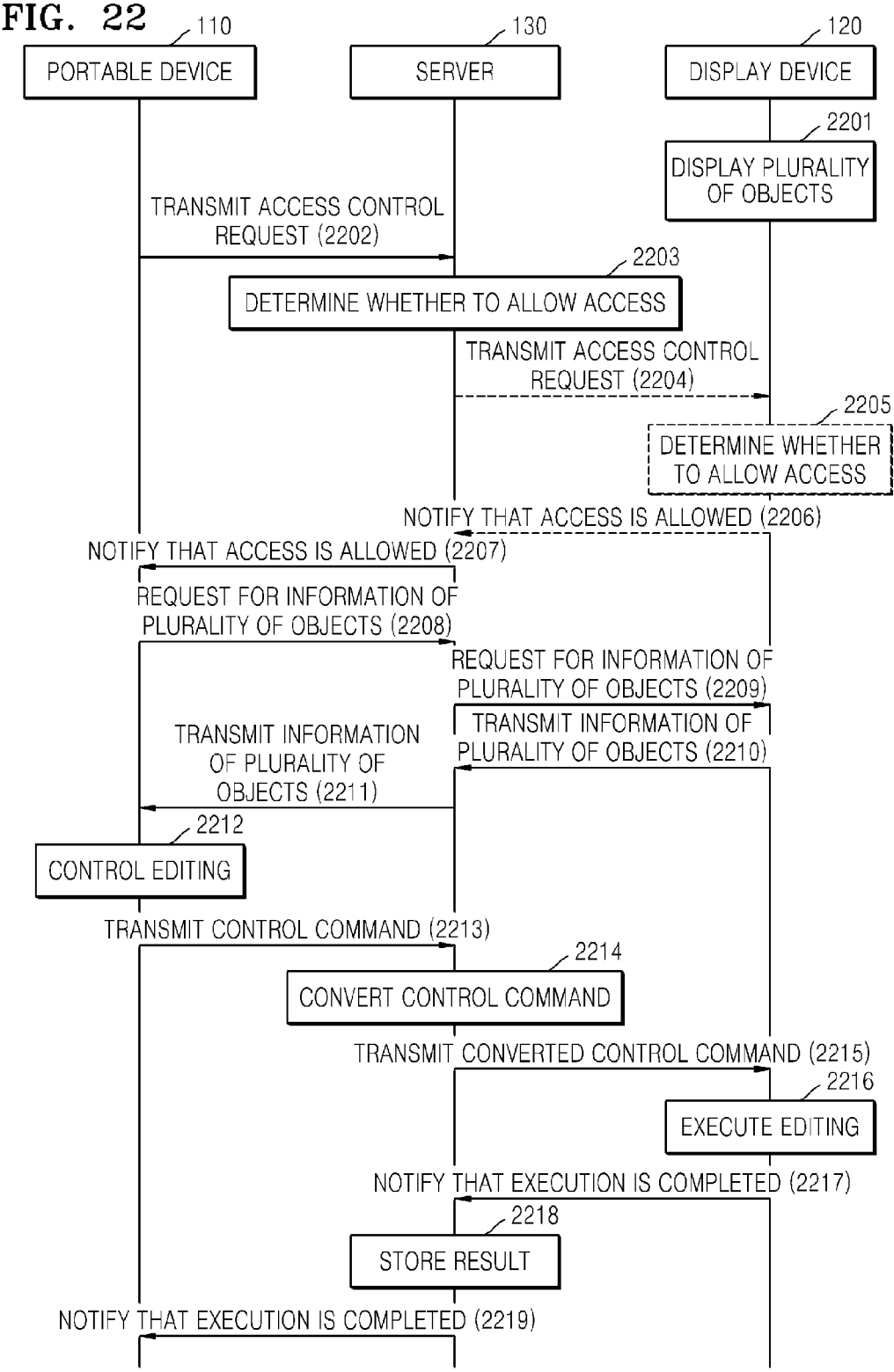

METHOD AND SYSTEM FOR CONTROLLING DISPLAY DEVICE AND COMPUTER-READABLE RECORDING MEDIUM

CROSS-REFERENCE TO RELATED PATENT APPLICATION

This application claims priority from Korean Patent Applications No. 10-2013-0036173, filed on Apr. 3, 2013, and No. 10-2012-0036403, filed on Apr. 7, 2012, in the Korean Intellectual Property Office, the disclosure of which is incorporated herein by reference in its entirety.

BACKGROUND

1. Field

Methods and apparatuses consistent with the exemplary embodiments relate to controlling a display device, and more particularly, to a method and system for remotely editing a screen of a display device.

2. Description of the Related Art

Functions of a display device having a communication function have been diversified. For example, a digital television (TV) may perform various functions, such as web browsing, application browsing, and contents browsing, as well as a function of receiving broadcast content.

The various functions of the display device are required to be remotely controlled.

SUMMARY

One or more exemplary embodiments provide a method and system for controlling a screen displayed on a display device using a portable device.

One or more exemplary embodiments also provide a method and system for controlling a screen including a plurality of applications displayed on a display device using a portable device.

One or more exemplary embodiments also provide a method and system for controlling a display device based on a screen displayed on the display device using a portable device.

According to an aspect of an exemplary embodiment, there is provided a method for controlling a display device, the method including receiving first display information of (or indicative of, or determining) a first arrangement of icons displayed on the screen of the display device, displaying the first arrangement of icons on a display of a portable device based on the first display information, modifying the first arrangement of icons displayed on the display of the portable device to generate a second arrangement of icons, generating second display information based on the second arrangement of icons, and transmitting to the display device a request to display the second arrangement of icons on the display of the display device, the request comprising the second display information.

The first display information may include display position information of the icons that indicates positions of the icons displayed on the screen of the display device.

The display position information may include coordinate information that indicates absolute positions of the icons at coordinate positions displayed on the screen of the display device with reference to coordinate positions of the screen of the display device.

The display position information may include coordinate information that indicates relative positions of the icons relative to each other on the screen of the display device.

The first display information may further include icon image data of the icons.

The first display information may be extensible markup language (XML) data.

The second display information may be (or comprise, or correspond to) the first display information modified to indicate new positions of the icons to be displayed on the screen of the display device.

The second display information may be (or comprise, or correspond to) a difference between the first display information and new positions of the icons to be displayed on the screen of the display device.

The method may further include displaying the second arrangement of icons on the display of the portable device while the display device displays the first arrangement of icons on the display of the display device.

The modifying may include at least one of changing a position of at least one of the icons in the first arrangement of icons to be a new position of the at least one of the icons in the second arrangement of icons, deleting the at least one of the icons in the first arrangement of icons, adding a new icon to the icons in the first arrangement of icons.

The first display information is extensible markup language (XML) data and the modifying may include modifying the XML data based on the at least one of the changing, the deleting, and the adding.

The modifying may include receiving an input on the display of the portable display that modifies an icon in the first arrangement of icons and generating the second arrangement of icons based on the input.

The icons may include icons representing content to be reproduced by the display device and icons representing applications of the display device.

According to an aspect of another exemplary embodiment, there is provided a portable device including a display, a communication unit that receives first display information of (or indicative of, or determining) a first arrangement of icons displayed on a screen of a display device, a controller that controls the display to display the first arrangement of icons on the display based on the first display information, receives an input modifying the first arrangement of icons displayed on the display, generates a second arrangement of icons based on the input, generates second display information based on the second arrangement of icons, and controls the communication unit to transmit to the display device a request to display the second arrangement of icons on a display of the display device, the request comprising the second display information.

According to an aspect of another exemplary embodiment, there is provided a non-transitory computer-readable medium having recorded thereon a program that causes a portable device to execute a method of editing a screen of a display device, the method including receiving first display information of (or indicative of, or determining) a first arrangement of icons displayed on the screen of the display device, displaying the first arrangement of icons on a display of the portable device based on the first display information, modifying the first arrangement of icons displayed on the display of the portable device to generate a second arrangement of icons, generating second display information based on the second arrangement of icons, and transmitting to the display device a request to display the second arrangement of icons on the display of the display device, the request comprising the second display information.

BRIEF DESCRIPTION OF THE DRAWINGS

The above and/or other aspects and embodiments of the invention will become more apparent by describing in detail exemplary embodiments with reference to the attached drawings in which:

FIG. 3 is a block diagram illustrating a display device, according to an exemplary embodiment;

FIGS. 5A through 5D are views illustrating screens of the display device and the portable device according to the method of FIG. 4;

FIG. 22 is a flowchart illustrating a method of controlling screen editing of the display device, according to an exemplary embodiment.

DETAILED DESCRIPTION OF THE EXEMPLARY EMBODIMENTS

Figure 1A:
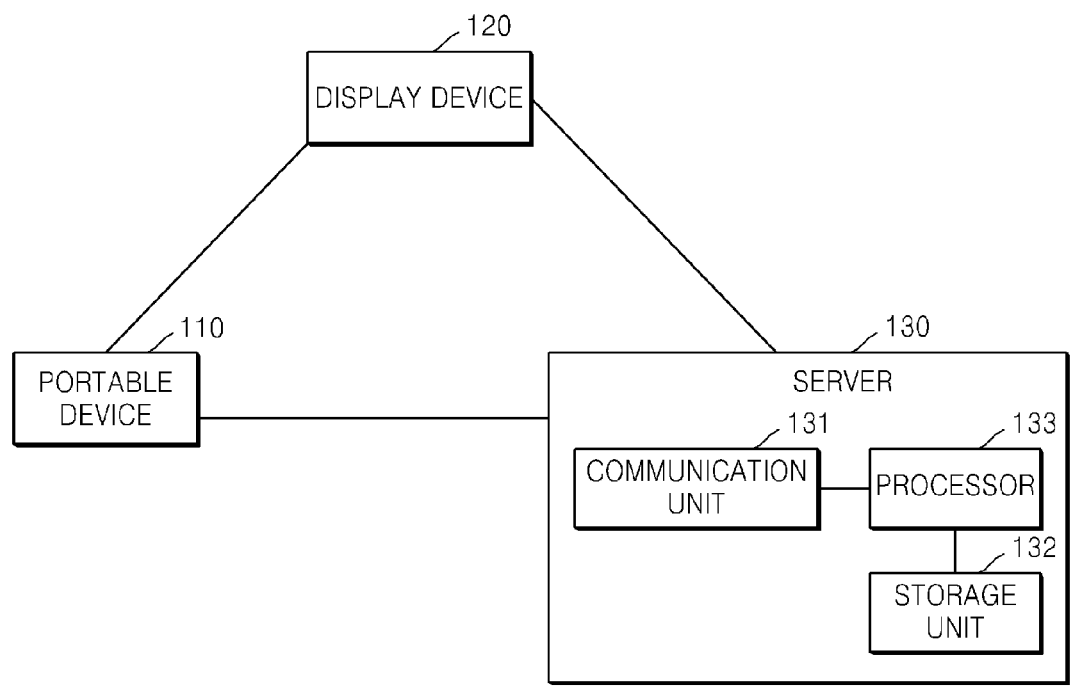
FIG. 1A is a block diagram illustrating a system for controlling a screen editing and/or a function of a display device, according to an exemplary embodiment.

As used herein, the term "and/or" includes any and all combinations of one or more of the associated listed items. Expressions such as "at least one of," when preceding a list of elements, modify the entire list of elements and do not modify the individual elements of the list.

The exemplary embodiments will now be described more fully with reference to the accompanying drawings. It should be understood, however, that the exemplary embodiments are not limited to the particular forms disclosed, but the exemplary embodiments to cover all modifications, equivalents, and alternatives falling within the spirit and scope of the disclosure. Also, while describing the exemplary embodiments, detailed descriptions about related well known functions or configurations that may blur the points of the present invention are omitted.

The terms "first", "second", and the like, "primary", "secondary", and the like, as used herein do not denote any order, quantity, or importance, but rather are used to distinguish one element, region, component, layer, or section from another.

Most of the terms used herein are general terms that have been widely used in the technical art to which the disclosure pertains. However, some of the terms used herein may be created reflecting intentions of technicians in this art, precedents, or new technologies. Also, some of the terms used herein may be arbitrarily chosen. In such a case, the terms will be described in detail below. Accordingly, the specific terms used herein should be understood based on the unique meanings thereof and the context of the disclosure.

As used herein, the singular forms "a", "an", and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof.

The expressions 'first arrangement' and 'second arrangement' used herein each refer to a one-dimensional (1D) or two-dimensional (2D) arrangement based on a position of information included in a screen which is displayed. Examples of the screen which is displayed may include a menu screen, an application browsing screen, a contents browsing screen, a web browsing screen, and a peripheral device control screen.

The term 'object' used herein refers to one piece of information included in a screen, and the screen is displayed. Examples of the information included in the screen may include an image of an application, an image of contents, an image of a web page, and an image of a peripheral device. Each of the image of the application, the image of the contents, the image of the web page, and the image of the peripheral device refers to a symbolic image or an image shown as a menu item that may clearly represent each of the application, the contents, the web page, and the peripheral device. The image of the application may correspond to, for example, an icon of the application.

The expression 'information of the object' refers to information of the application, the contents, the web page, and the peripheral device. The information of the object may include the symbolic image, such as an icon, thumbnail, or the image shown as a menu item. The information of the object used herein may include information included in the screen and information not included in the screen. Examples of the information included in the screen may include at least one from among the symbolic image, the thumbnail, and the image shown as a menu item. The information not included in the screen may include at least one of, for example, display position information, application detailed information (or guide information), application preview information, and application editing control information (e.g., move, erase, copy, set, add, etc.). The application detailed information may include a title of the application, a type of the application, and information indicating contents of the application.

The information of the contents, the information of the web page, and the information of the peripheral device may include information included in the screen and information not included in the screen, like the information of the application. The information not included in the screen refers to information not displayed on the screen. The information not included in the screen may refer to metadata or attribute information of the information.

The peripheral device refers to a device that may be connected to a display device. Examples of the peripheral device may include, for example, a media recording/reproducing apparatus, a printer, a camera, and an audio apparatus.

The expressions 'first arrangement' and 'second arrangement' used herein each refer to an arrangement of information on a screen. That is, each of the first arrangement and the second arrangement may refer to an arrangement of an application shown as a menu item on a screen, an arrangement of contents on a screen, an arrangement of a web page shown as a menu item on a screen, or an arrangement of a peripheral device shown as a menu item on a screen.

The first arrangement refers to an arrangement based on a screen which is displayed on a display device. The second arrangement refers to an arrangement generated by controlling screen editing of a portable device. Accordingly, the second arrangement may refer to an information arrangement of the whole screen including information obtained by changing information included in the screen based on the first arrangement. However, the second arrangement may refer to only an arrangement of the changed information on the screen.

Controlling of screen editing based on information of a plurality of objects displayed on a display device may be construed as controlling screen editing of information displayed on the display device or controlling of the display device.

The expression 'user input information' used herein may depend on a user's gesture. The user's gesture may be defined according to an input device. That is, when the input device is based on a touch screen, examples of the user's gesture may include, but are not limited to, for example, tap, touch and hold, double tap, drag, panning, flick, drag and drop, and sweep. The user's gesture based on the touch screen may be performed by using the user's finger or a touch tool (for example, a stylus pen).

When the input device is based on a camera, examples of the user's gesture may include a spatial gesture based on an image captured by the camera. However, examples of the user's gesture may include a spatial gesture based on a movement of a portable device (for example, shaking of the portable device).

When the input device includes at least one of a physical button, a dial, a slider switch, a joystick, and a click wheel, the user input information may depend on the user's physical control on the input device. When the input device is based on an audio input device, the user input information may depend on speech recognition of the user's voice based on a natural language.

The exemplary embodiments will now be described more fully with reference to the accompanying drawings, in which the exemplary embodiments are shown. In the drawings, the same or corresponding elements are denoted by the same or corresponding reference numerals, and thus a repeated explanation thereof will not be given.

FIG. 1A is a block diagram illustrating a system 100 in FIG. 1A for editing a screen of a display device 120, according to an exemplary embodiment. The block diagram of FIG. 1A may illustrate a network configuration between the portable device 110, the display device 120, and the server 130

Referring to FIG. 1A the system 100 includes a portable device 110, the display device 120, and a server 130.

Figure 1B:
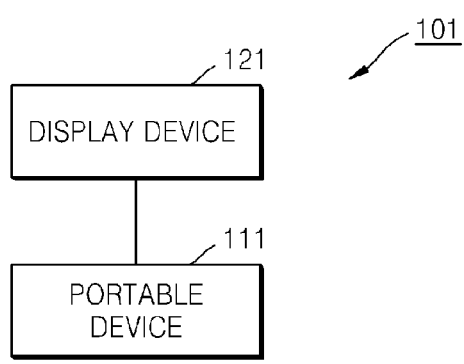
FIG. 1B is a block diagram illustrating a system for controlling a screen editing and/or a function of a display device, according to an exemplary embodiment.

The system is not limited as the system 100 shown in FIG. 1A, and may be embodied according to the system 101 of FIG. 1B. The system 101 includes a portable device 111 and a display device 121, as shown in FIG. 1B. The portable devices 110 and 111 and the display devices 120 and 121 may be referred to as first devices and second devices, respectively. The portable devices 110 and 111 may be referred to as devices for controlling screen editing of the display devices 120 and 121 or devices for controlling the display devices 120 and 121.

Examples of the portable devices 110 and 111 of FIGS. 1A and 1B may include smart phones, notebooks, tablets, mobile devices, handheld devices, handheld PCs, phablets, and personal digital assistants (PDAs), but are not limited thereto.

The portable device 110 of FIG. 1A receives information of a screen displayed on the display device 120 from the display device 120 or the server 130. The portable device 110 generates an editing control signal for editing the screen displayed on the display device 120 based on the information of the screen. The portable device 110 may also generate a function control signal for controlling a function of the display device 120. The portable device 110 transmits the editing control signal or the function control signal to the display device 120 or the server 130.

The portable device 111 of FIG. 1B receives information of a screen displayed on the display device 121 from the display device 121. The portable device 111 generates an editing control signal or a function control signal for the screen displayed on the display device 121 based on the information of the screen. The portable device 111 transmits the editing control signal or the function control signal to the display device 121.

Examples of the display devices 120 and 121 of FIGS. 1A and 1B may include televisions having a communication function and digital consumer electronic (CE) devices having a communication function and a display function, but are not limited thereto. Examples of the digital CE devices may include digital TVs and refrigerators having a communication function, and Internet protocol TVs (IPTVs), but are not limited thereto.

When a display information request signal is received, the display device 120 of FIG. 1A transmits the information of the displayed screen to the portable device 110 or the server 130. When an editing control signal or a function control signal for the information of the displayed screen is received from the portable device 110 or the server 130, the display device 120 edits the displayed screen according to the editing control signal, or controls a function based on the displayed screen according to the function control signal. The editing of the displayed screen is a control to adjust the displayed screen to display new information or a different configuration of information displayed thereon. The function control signal based on the screen may be, for example, an application execution control signal to execute an application referenced on the display screen.

When a display information request signal is received, the display device 121 of FIG. 1B transmits the information of the displayed screen to the portable device 111. When an editing control signal or a function control signal for the information of the displayed screen is received from the portable device 111, the display device 121 may edit the displayed screen according to the editing control signal or controls a function based on the displayed screen according to the function control signal. The function control signal based on the screen may be, for example, an application execution control signal to execute an application referenced on the display screen.

The server 130 of FIG. 1A communicates with the portable device 110 and the display device 120 to control a screen editing and/or a function of the display device 120.

The server 130 includes a communication unit 131, a storage unit 132, and a processor 133. The communication unit 131 may perform wired or wireless communication with the portable device 110 and the display device 120. Accordingly, the communication unit 131 may be configured and operate in a similar manner to that of a communication unit 208 included in the portable device 110, which will be explained below.

The storage unit 132 stores at least one program that may be executed by the processor 133 and a resource of the program. In particular, the storage unit 132 stores editing history information of a screen displayed on the display device 120, thereby storing a history of edits made to the screen displayed on the display device 120. The editing history information may be stored in association with users, portable devices, and edited objects. Also, the editing history information may be stored in association with a path or information through or by which erased or edited information may be recovered.

The processor 133 may include at least one processor. The processor 133 receives a request signal displayed on the display device 120 from the portable device 110 by loading the program stored in the storage unit 132, receives information of a plurality of applications displayed in a first arrangement from the display device 120, transmits the information of the plurality of applications to the portable device 110, and transmits information of a second arrangement of the plurality of applications received from the portable device 110 to the display device 120. The information of the plurality of applications refers to screen information displayed on the display device 120.

When the system is the system 100 including the portable device 110, the display device 120, and the server 130, as shown in FIG. 1A, the portable device 110 and the display device 120 transmit and receive information for controlling a screen editing and/or a function through the server 130.

Examples of the server 130 may include a cloud server and a home gateway, but are not limited thereto.

When the system is the system 101 including the portable device 111 and the display device 121, as shown in FIG. 1B, information for controlling a screen editing and/or a function may be directly transmitted and received between the portable device 111 and the display device 121, without the user of the server 130 as an intermediary device.

Figure 2A:
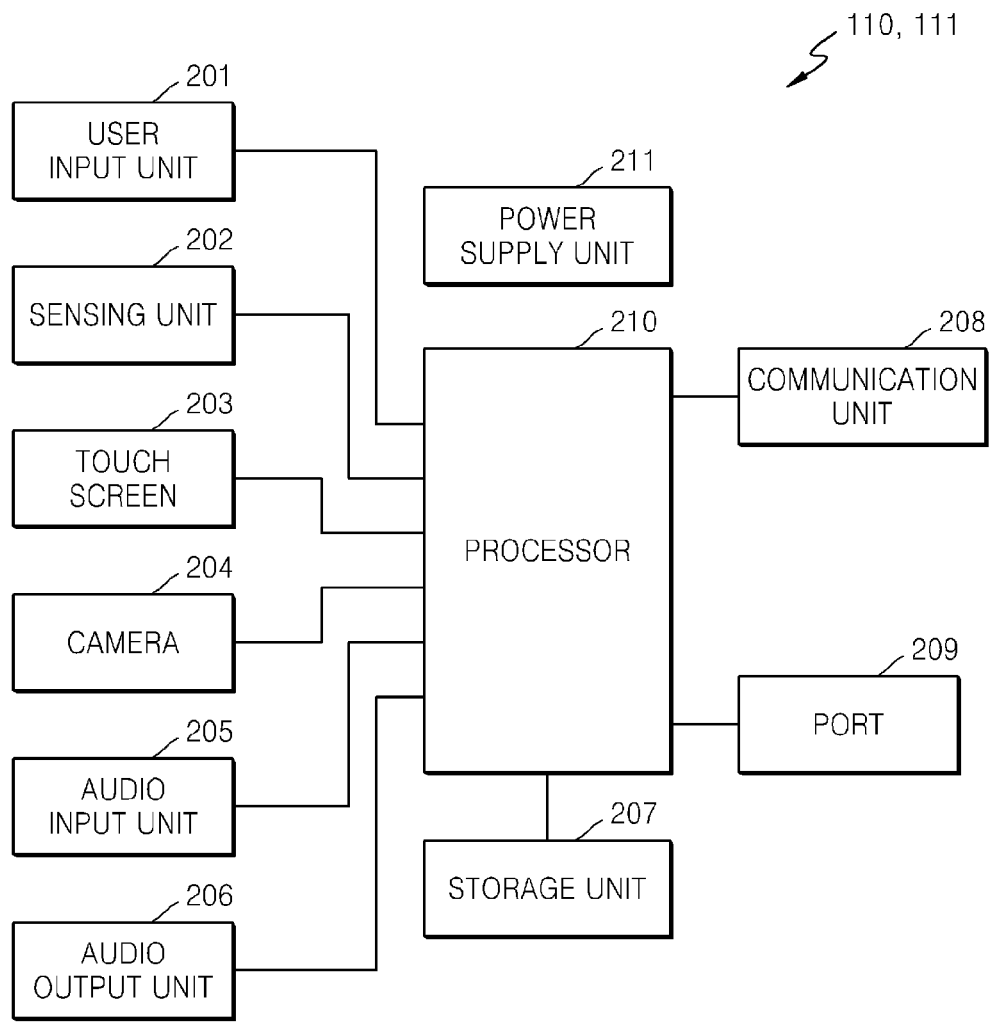
FIG. 2A is a block diagram illustrating a portable device according to an exemplary embodiment.

FIG. 2A is a block diagram illustrating each of the portable devices 110 and 111 of FIGS. 1A and 1B, according to an exemplary embodiment.

Referring to FIG. 2A, each of the portable devices 110 and 111 includes a user input unit 201, a sensing unit 202, a touch screen 203, a camera 204, an audio input unit 205, an audio output unit 206, a storage unit 207, the communication unit 208, a port 209, the processor 210, and a power supply unit 211. However, a structure of each of the portable devices 110 and 111 is not limited thereto.

The user input unit 201 receives input (or control data) for controlling an operation of each of the portable devices 110 and 111. The user input unit 201 may include at least one of a keypad, a dome switch, a touchpad which may replace a mouse, a jog wheel, a jog switch, and a hardware (H/W) button. The sensing unit 202 detects a current state of each of the portable devices 110 and 111, such as a position of each of the portable devices 110 and 111, whether the user contacts the portable devices 110 and 111, an orientation of each of the portable devices 110 and 111, or an acceleration or a deceleration of each of the portable devices 110 and 111, and generates a sensing signal for controlling an operation of each of the portable devices 110 and 111.

The sensing unit 202 may include a proximity sensor. The proximity sensor refers to a sensor that detects the presence of an object accessing a preset detection surface or the presence of an object existing around the preset detection surface by using an electromagnetic field or infrared rays without mechanical contact. Examples of the proximity sensor include a transmissive photoelectric sensor, a direct reflection-type photoelectric sensor, a mirror reflection-type photoelectric sensor, a high-frequency oscillation-type proximity sensor, an electrostatic capacitive proximity sensor, a magnetic proximity sensor, and an infrared proximity sensor.

The user input data based on the touch screen 203 may be generated by the user's request or selection depending on the user's gesture. The user's gesture may be defined according to one or more of the number of times a touch occurs, a touch pattern, a touch area, a touch strength or pressure. A touch based on the user's finger is construed as a touch of a user's body part that may contact a touch zone of the touch screen 203.

Also, the touch screen 203 may include any of various sensors for detecting a touch or a proximity touch of the touch screen 203. The sensor included in the touch screen 203 refers to a sensor that detects the user's gesture or pattern on the touch screen 203, and generates a signal obtained by sensing a drag, flick, tap, touch and hold, double tap, panning, or sweep recognized as the user's gesture.

An example of the sensor for detecting a touch of the touch screen 203 is a tactile sensor. The tactile sensor may detect various pieces of information, such as a roughness of a contact surface, a hardness of a contact object, and a temperature of a contact point. A touch of the touch screen 203 corresponds to a case where a pointer touches a panel. Examples of the touch may include a multi-touch. A proximity touch of the touch screen 203 corresponds to a case where the pointer does not actually touch the touch screen 203 and reaches a position apart from the touch screen 203 by a predetermined distance. The pointer is a tool for touching a specific portion of the touch screen 203 or a position proximate to the touch screen 203. Examples of the pointer may include a stylus pen, and user's fingers. The pointer may be referred to as an external input device.

When a screen editing is controlled, a stylus pen-based user interface (UI) may be provided. For example, a UI that displays a specific mark (for example, the mark 'X', when information is erased) on information included in a displayed screen on the touch screen 203 and, by using a stylus pen, removes the information or moves screen information like a spoide effect may be provided. The spoide effect indicates a phenomenon as if water (the screen information) is sucked into a spoide (the stylus pen) and then is dropped from the spoide.

The touch screen 203 outputs information processed by each of the portable devices 110 and 111. For example, the touch screen 203 displays a screen responding to a signal detected by the sensing unit 202 or user input information or control data input by the user input unit 201 or a touch pattern or the user's gesture sensed by a sensing unit included in the touch screen 203. The touch screen 203 may be referred to as an input/output (I/O) device. When the touch screen 203 is an I/O device, the screen displayed on the touch screen 203 includes a UI or graphic user interface (GUI). The touch screen 203 displays screen information in a first arrangement received from the display device 120 and displays changed screen information based on the user input information, and receives the user input information.

Examples of the touch screen 203 may include, but are not limited to, a liquid crystal display (LCD), a thin film transistor-LCD, an organic light-emitting diode display, a flexible display, a 3D display, and an active-matrix organic light-emitting diode (AMOLED) display. The touch screen 203 may be referred to as a display. Two or more touch screens 203 may be provided according to a type of the portable devices 110 and 111.

The camera 204 processes an image frame, such as a still image or a motion picture obtained by an image sensor in a video call mode, a photographing mode, etc. The processed image frame may be displayed on the touch screen 203. The image frame processed by the camera 204 may be stored in the storage unit 207 or may be transmitted through the communication unit 208 or the port 209 to a destination device. The camera 204 may include two or more cameras according to a structure of each of the portable devices 110 and 111. Also, the camera 204 may be used as an input device that recognizes the user's spatial gesture.

The audio input unit 205 receives an external sound signal in a call mode, a video-recording mode, a speech recognition mode, etc., converts the external sound signal into electrical voice data, and transmits the electrical voice data to the processor 210. The audio input unit 205 may include, for example, a microphone. The audio input unit 205 may include various noise removing algorithms for removing noise generated when the external sound signal is received.

The sound signal input using the audio input unit 205 may be user input information for editing a screen of each of the display devices 120 and 121 or controlling a function on the screen. That is, the sound signal input by using the audio input unit 205 may be user input information obtained from speech recognition of the user's voice based on natural language. The external sound signal input by the audio input unit 205 may be stored in the storage unit 207 or may be transmitted through the communication unit 208 or the port 209 to a destination device.

The user input unit 201, the sensing unit 202, the touch screen 203, the camera 204, and the audio input unit 205 may each be referred to as an input device or an I/O device according to an interface function between the portable devices 110 and 111 and the user. For example, when an interface function between the portable device 110 and the user includes a touch recognition function, a speech recognition function, and a spatial gesture recognition function, the user input unit 201, the sensing unit 202, the camera 204, and the audio input unit 205 may each be referred to as an input device, and the touch screen 203 may be referred to as an I/O device.

The audio output unit 206 outputs a sound signal or an audio signal received from the outside in a call mode, an audio reproduction mode, etc. The audio signal output unit 206 may include a speaker. The audio input unit 205 and the audio output unit 206 may be integrally configured, such as in the form of a headset.

The storage unit 207 stores at least one program that may be executed by the processor 210, and a program resource. Examples of the at least one program include a program for executing a method of controlling a function based on a screen and/or a editing a screen of each of the display devices 120 and 121, an operating system program of each of the portable devices 110 and 111, an application of each of the portable devices 110 and 111, and a program needed to perform various functions (for example, a communication function and a display function) of each of the portable devices 110 and 111.

Examples of the program resource include information needed to execute the programs, UI screen information for controlling screen editing, and message information that acknowledges a selected editing control function.

The UI screen information for controlling screen editing may include UI screen information for screen editing (move, erase, copy, add, set, or backup) of selected screen information. The UI screen information for controlling a function on a screen may include UI screen information for executing selected screen information. The UI screen information for controlling a screen editing and the UI screen information for controlling a function based on a screen may be provided together.

The program for executing a method of controlling a screen editing and/or a function of each of the display devices 120 and 121 stored in the storage unit 207 may include an application for controlling screen editing and/or a function of each of the display devices 120 and 121, or a remote control application including a screen editing menu and/or a function control menu of each of the display devices 120 and 121.

Accordingly, the method of controlling a screen editing and/or a function of each of the display devices 120 and 121 may be performed after the application for controlling screen editing and/or a function is executed or may be performed after the remote control application is executed and then the screen editing or the function control is performed.

The storage unit 207 may separately include a storage unit that stores at least one program needed to perform various functions of each of the portable devices 110 and 111 including the operation system, and a storage unit that stores at least one program and a resource for executing a method of controlling a screen editing of the display devices 120 and 121 and the applications.

Also, the storage unit 207 may store editing history information. That is, the editing history information may be generated by the processor 210 as a second arrangement and may be stored in the storage unit 207. The editing history information may be generated such that all edited procedures are sequentially known. Alternatively, the editing history information may be generated in units of edited screens such that contents of a screen before editing and contents of a screen after editing are known.

Examples of the storage unit 207 may include a non-volatile memory, such as a high-speed random access memory (RAM), a magnetic disc storage device, or a flash memory, and other non-volatile semiconductor devices. Accordingly, the storage unit 207 may be referred to as a memory.

The communication unit 208 is configured to transmit to and receive data from the display device 120 and the server 130 via wired or a wireless network, such as wireless Internet, wireless Intranet, a wireless telephone network, a wireless local area network (LAN), Wi-Fi network, Wi-Fi direction (WFD) network, third generation (3G) network, fourth generation (4G) LTE (Long Term Evolution) network, Bluetooth network, infrared data association (IrDA) network, radio frequency identification (RFID) network, ultra wideband (UWB) network, ZigBee network, and near field communication network.

The communication unit 208 may include at least one of, but is not limited to, a broadcast receiving module, a mobile communication module, a wireless Internet module, a wired Internet module, a short distance communication module, and a position information module.

The broadcast receiving module receives a broadcast signal and/or broadcast-related information from an external broadcast management server through a broadcast channel. Examples of the broadcast channel may include a satellite channel and a terrestrial channel. The mobile communication module transmits and receives a wireless signal to/from at least one of a base station, an external terminal (for example, each of the display devices 120 and 121), and the server 130 via a mobile communication network. The wireless signal may include various types of data, such as a voice call signal, a video call, or a text/multimedia message transmission/reception. The wireless Internet module refers to a module for wireless Internet access. The wired Internet module refers to a module for wired Internet access.

The short distance communication module refers to a module for short distance based communication. Examples of a short distance communication technology may include Bluetooth based technology, RFID based technology, infrared communication based technology, UWB based technology, Zigbee based technology, WFD based technology, and near field communication (NFC) based technology.

The position information module is a module for detecting or obtaining a position of each of the portable devices 110 and 111. For example, the position information module may be a global position system (GPS) module. The GPS module receives position information from a plurality of satellites. The position information may include coordinate information having a latitude and a longitude.

The port 209 may transmit and receive data with an external device (not shown) using a plug and play interface, such as a universal serial bus (USB) port (not shown). The plug and play interface refers to a module that allows an external device to be connected with the portable devices 110 and 111 and automatically configured for access.

The power supply unit 211 supplies power to various elements of each of the portable devices 110 and 111. The power supply unit 211 includes at least one power supply, such as a battery or an alternating current (AC) power supply. Each of the portable devices 110 and 111 may not include the power supply unit 211, and may include a connection unit (not shown) that may be connected to an external power supply unit (not shown).

The processor 210 may be at least one processor for controlling an overall operation of each of the portable devices 110 and 111. The at least one processor of the processor 210 may a plurality of processors or processor cores and may operate as the plurality of processors according to a function of each of the portable devices 110 and 111.

The processor 210 may control the user input unit 201, the sensing unit 202, the touch screen 203, the camera 204, the audio input unit 205, the audio output unit 206, the storage unit 207, the communication unit 208, the port 209, and the power supply unit 210. Accordingly, the processor 210 may be referred to as a controller, a microprocessor, or a digital signal processor. Also, the processor 210 may provide a user interface based on the touch screen 203 and user input information input by using the user input unit 210, the sensing unit 202, the camera 203, and the audio input unit 205, which correspond to an input device. The processor 210 may be connected to the elements of the portable devices 110 and 111 through at least one bus (not shown) that connects the elements of the portable devices 110 and 111 to each other.

The processor 210 may execute at least one program related to a method of controlling screen editing and/or a function of each of display devices 120 and 121. The processor 210 may read the program from the storage unit 207 and execute the program, or may download the program from an external device, such as an application providing server (not shown) or a market server (not shown) connected through the communication unit 208 and execute the program. It will be understood that the processor 210 includes an interface function unit between the processor 210 and various functional modules in each of the portable devices 110 and 111. An operation of the processor 210 related to a method of controlling screen editing and/or a function of each of the display devices 120 and 121 may be performed as shown in FIGS. 4, 6-8, 9-11, and 19.

Figure 2B:
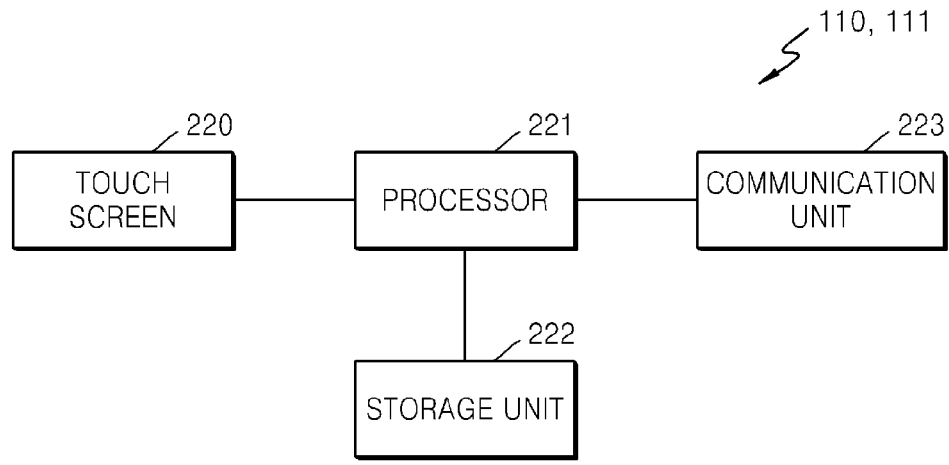
FIG. 2B is a block diagram illustrating a portable device according to an exemplary embodiment.

FIG. 2B is a block diagram illustrating each of the portable devices 110 and 111 of FIGS. 1A and 1B, according to another exemplary embodiment. Referring to FIG. 2B, each of the portable devices 110 and 111 includes a touch screen 220, a processor 221, a storage unit 222, and a communication unit 223. The touch screen 220 is configured in the same manner as the touch screen 203 of FIG. 2A and displays a plurality of objects and receives user input information.

The communication unit 223 is configured in the same manner as the communication unit 208 of FIG. 2A and communicates with each of the display devices 120 and 121.

The processor 221 provides a user interface based on the touch screen 220, receives information of a plurality of objects in a first arrangement from each of the display devices 120 and 121, displays the plurality of objects on the touch screen 220 based on the information of the plurality of objects, generates a second arrangement and changes the information of the plurality of objects based on user input information, and transmits information of the second arrangement to each of the display devices 120 and 121. Accordingly, at least one of the plurality of objects may be edited using the touch screen 220 and the edited plurality of objects may be displayed by the display devices 120 and 121 based on the information of the second arrangement on each of the display devices 120 and 121.

FIG. 3 is a block diagram illustrating a display device. The display device may be the display devices 120 and 121 of FIGS. 1A and 1B. In FIG. 3, the display devices 120 and 121 may be a TV having a communication function.

Referring to FIG. 3, each of the display devices 120 and 121 includes a wireless communication unit 301, a communication unit 302, a broadcast signal receiving unit 303, a storage unit 304, a processor 305, an image processing unit 306, a display unit 307, an audio processing unit 308, an audio output unit 309, and an audio input unit 310. The display devices 120 and 121 are not limited to a structure of FIG. 3, and may not include the broadcast signal receiving unit 303.

The wireless communication unit 301 is configured to wirelessly communicate with, for example, a remote controller (not shown). When the remote controller may include an IR transmitter, the wireless communication unit 301 may include a corresponding IR receiver that receives an infrared signal transmitted from the remote controller, demodulates the infrared signal, and transmits the demodulated infrared signal to the processor 305. When the remote controller may include an RF module, the wireless communication unit 301 may include an corresponding RF module that receives an RF signal transmitted from the remote controller, and transmits the RF signal to the processor 305. The wireless communication unit 301 is not limited to the IR receiver and the RF module, and may be configured to employ one or more other technologies, for example short distance communication technology, such as Bluetooth communication technology.

The communication unit 302 performs wireless data communication with the server 130 or each of the portable devices 110 and 111 connected via a wireless communication module. The display devices 120 and 121 may communicate with the server 130 and each of the portable devices 110 and 111 via a wireless communication network, such as Bluetooth network, RFID network, WiFi network, IrDA network, UWB network, ZigBee network, or near field communication (NFC) network, a wired communication network, such as a home phone line networking alliance (PNA), power line communication (PLC), IEEE 1394, wired Internet, or any of other various home networks.

When a request signal for information being displayed is received from each of the portable devices 110 and 111 or the server 130 connected through the communication unit 302, the processor 305 transmits information displayed on the display unit 307 to each of the requesting portable devices 110 and 111 or the requesting server 130 through the communication unit 302, and edits and displays at least one of the pieces of information displayed on the display unit 307 based on information of a second arrangement subsequently received from each of the portable devices 110 or 111 or the server 130, or controls a function. The processor 305 may include at least one processor, like the processor 210 of FIG. 2A.

The broadcast signal receiving unit 303 divides a broadcast signal received from a tuner (not shown) into an image signal and a voice signal and outputs the image signal and the voice signal. That is, the tuner selects an RF broadcast signal corresponding to all channels previously stored or a channel selected by the user from among RF broadcast signals received through an antenna. Also, the tuner converts the selected RF broadcast signal into an intermediate frequency signal, a baseband image, or voice signal. The intermediate frequency signal, the baseband image, or the voice signal is input to the processor 305.

The storage unit 304 may be a memory that stores a program for processing and controlling various signals executed by the processor 305, and may store information of each of the portable devices 110 and 111, information of each of the display devices 120 and 121, and user information of each of the display devices 120 and 121. The information of each of the portable devices 110 and 111 may be used to determine whether to allow access when there is an access control authorization request signal from each of the portable devices 110 and 111. Alternatively, the information of each of the portable devices 110 and 111 may be used to display each of the portable devices 110 and 111 connected to each of the display devices 120 and 121 after information displayed on each of the display devices 120 and 121 is transmitted to each of the portable devices 110 and 111. The information of each of the portable devices 110 and 111 may refer to authentication information.

The processor 305 controls an overall function of each of the display devices 120 and 121. The processor 305 may control data exchange with the portable devices 110 and 111 through the communication unit 302. The processor 305 may form a UI screen by executing a program stored in the storage unit 304, and display the UI screen on the display unit 307 through the image processing unit 306.

The UI screen may include a screen displaying information of each of the portable devices 110 and 111. Also, the UI screen may include a screen displaying screen information (for example, an application) selected by each of the portable devices 110 and 111. That is, as information of an application selected by each of the portable devices 110 and 111 is received, a UI screen, which may distinguish the selected application from a non-selected application, may be provided.

The image processing unit 306 includes an image decoder (not shown) and a scaler (not shown). The image processing unit 306 processes an image signal output from the broadcast signal receiving unit 303 to be displayed on a screen. The image decoder decodes a demultiplexed image signal, and the scaler performs scaling for the display unit 307 to output a resolution of the decoded image signal.

The display unit 307 may output an image processed by the image processing unit 306. Examples of the output image may include an image received from the broadcast signal receiving unit 303, the UI screen, an application browsing screen including a plurality of applications, a contents browsing screen including contents, a web browsing screen, and a selectable peripheral device control screen. The display unit 307 may include a touch screen and may be used as an input device.

The audio processing unit 308 processes a voice signal output from the broadcast signal receiving unit 303 and an audio included in contents received through the communication unit 302 and outputs the processed voice signal and audio to the audio output unit 309. The audio output unit 309 may be variously configured to output a stereo signal, a 3.1 channel signal, or a 5.1 channel signal.

Also, the audio processing unit 308 may process a signal input from the audio input unit 310 and transmit the signal to the processor 305. The audio input unit 310 may include a microphone.

Figure 4:
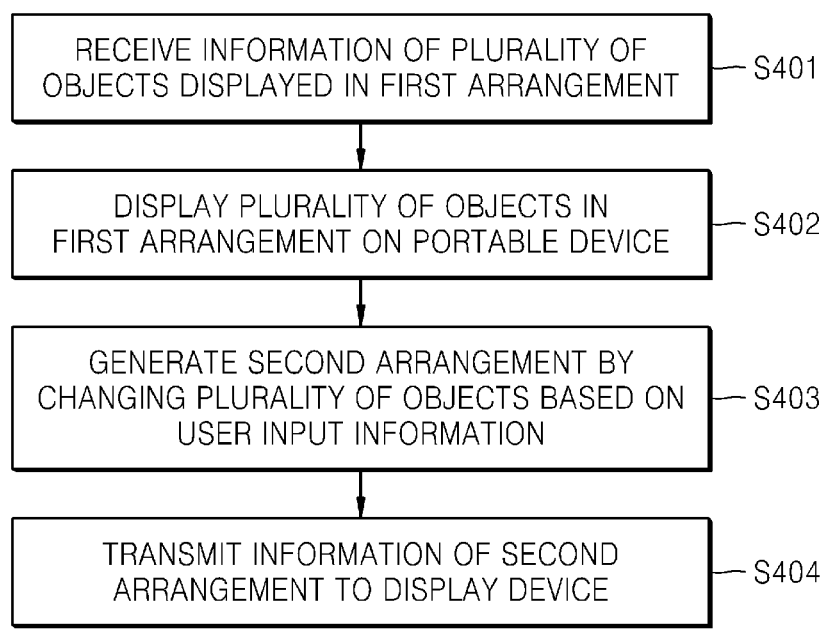
FIG. 4 is a flowchart illustrating a method of controlling screen editing of the display devices, according to an exemplary embodiment.

FIG. 4 is a flowchart illustrating a method of controlling screen editing of the display devices 120 and 121 according to an exemplary embodiment. Although the method of FIG. 4 may be performed by the processor 210 of FIG. 2A or the processor 221 of FIG. 2B, the following will be explained based on a relationship between the processor 210 and the display device 120 for convenience of explanation.

In operation S401, the processor 210 receives information of a plurality of objects from the display device 120 through the communication unit 208. The information of the plurality of objects is screen information displayed in a first arrangement on the display device 120. The display device 120 may be referred to as an external display device.

To receive the information of the plurality of objects, the processor 210 may execute a separate screen editing control application or may execute a remote control application stored in the storage unit 207 and select a screen editing menu item to execute a function for controlling screen editing. The processor 210 may transmit a display information request signal to the display device 120 through the communication unit 208.

The received information may include at least one of, for example, display image information of each object (such as an application or thumbnail icon), display position information of each object (such as a relative or absolute coordinate positions, or layout information indicating an arrangement of objects relative to each other or a display screen), detailed information of each object (such as identification of the object, metadata including a title, a URL, a file type, a file path to the object, an attribute of the object, etc.), preview information of each object (preview data or brief description of the object), and editing control information of each object (such as available commands that may be performed on the object, for example delete, move, hide, backup, set, etc.).

The delete command may be a command to delete an object. The move command may be a command to change a position of a displayed object. The hide command may be a command to hide the object from a user's view. The backup command may be a command to backup an object stored on the display device 120 to the portable device 110 or the server 130. The set command may be a command to set properties of the object, such as audio or video reproduction properties of content. The audio reproduction properties may be channel information (stereo, 5:1, 6:1, etc.), sound effect information, volume information, fade information, balance information, etc. when reproducing the content. The video reproduction properties may be a contrast, color balance, brightness, screen aspect ratio, etc. when reproducing the content. Also, the received information may include information obtained by capturing information displayed on the display device 120, for example images of icons or an arrangement of objects.

The information may be formatted according to a format that can be interpreted by the portable device 110, a format that can be interpreted by the display device 120, or a universal format that can be interpreted by the portable device 110 and the display device 120, such as extensible markup language (XML) format. The portable device 110, the display device 120, and the server 130 may convert the information between formats, as necessary.

In operation S402, the processor 210 displays a plurality of objects on the touch screen 203 of the portable device 110 in the first arrangement, based on the information received through the communication unit 208. A screen initially displayed on the touch screen 203 displays the plurality of objects in the first arrangement. The touch screen 203 may replicate the screen of the display device 120, or may replicate the screen of the display device 120 within a sub-window displayed on the touch screen 203. The processor 210 may reconstruct the received information to be suitable on the touch screen 203. For example, if the screen of the display device 120 is larger in size than the touch screen 203, the plurality of objects may be scaled down to be displayed on the touch screen. Thus, the plurality of object may still be faithfully reproduced on the touch screen 203, even though the display size of the display device 110 may be different than a size of the touch screen 203.

FIGS. 5A through 5D are views illustrating screens displayed on the display devices 120 and 121 and the portable devices 110 and 111 when a screen editing function, for editing the screens of the display device 120 and 121, is performed.

Referring to FIG. 5A, when a screen 510 is displayed on the display device 120 and 121, a screen 511 displayed on the display unit 203 of each of the portable devices 110 and 111 is the same as the screen 510 (in other words the screens initially display the same content, in the same general arrangement). In FIG. 5A, a plurality of applications are displayed on the screen 510 and the arrangement of the plurality of applications is replicated on the screen 511. The arrangement may then be modified on the screen 511 when a user selects one or more of the displayed applications. The information on the plurality of applications may be display position information, display image information, and other attribute information, as discussed above, and may be formatted for interpretation by the portable device 110 or the display device 120. FIG. 5A illustrates the information 520 formatted according to a universal XML format, which may be interpreted by the portable device 110 or the display device 120 to store, modify, and replicate the arrangement of objects between the portable device 110 and the display device 120.

In operation S403, the processor 210 generates a second arrangement. The second arrangement may be generated based on a user input to manipulate one of the displayed applications. In response to receiving the user input, the processor 210 may appropriately edit the information of the plurality of objects. That is, when the user selects one object on the screen 511 displayed on the touch screen 203 of the portable device 110 of FIG. 5A, a UI screen 513_1 for controlling an editing of the selected object may be displayed on a screen 513 of FIG. 5B. Although screen 512 illustrates that the application selected on the screen 511 of the display unit 203 is displayed on the display device 120, the selection may not be replicated on the display device 120 and only those changes to the arrangement may be reflected on the display device 120. Accordingly, operations performed on the portable device 110 may, or may not, be replicated on the display device 120, and only the changes to the arrangement may be reflected.

Figure 5B:
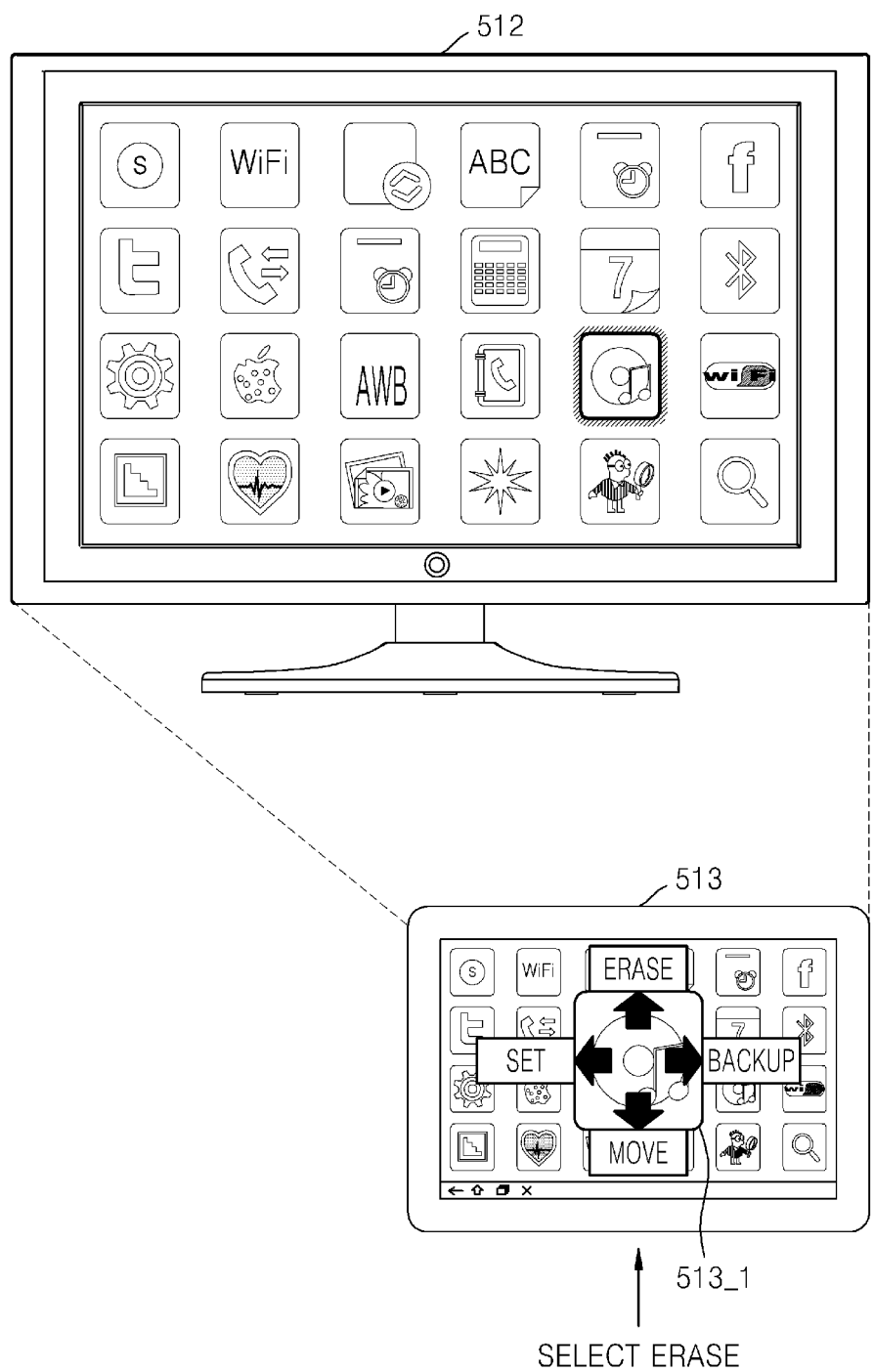
Figure 5C:
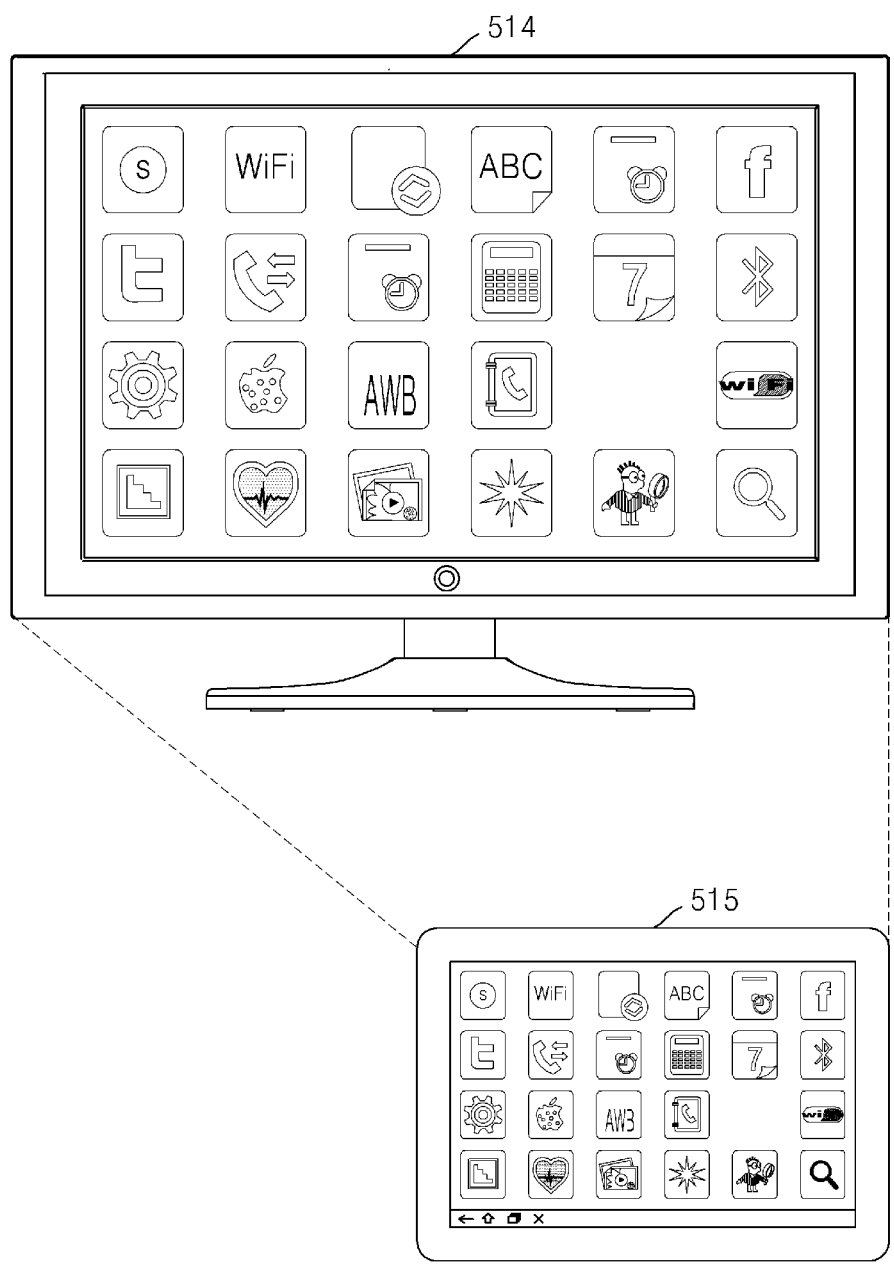
Figure 5D:
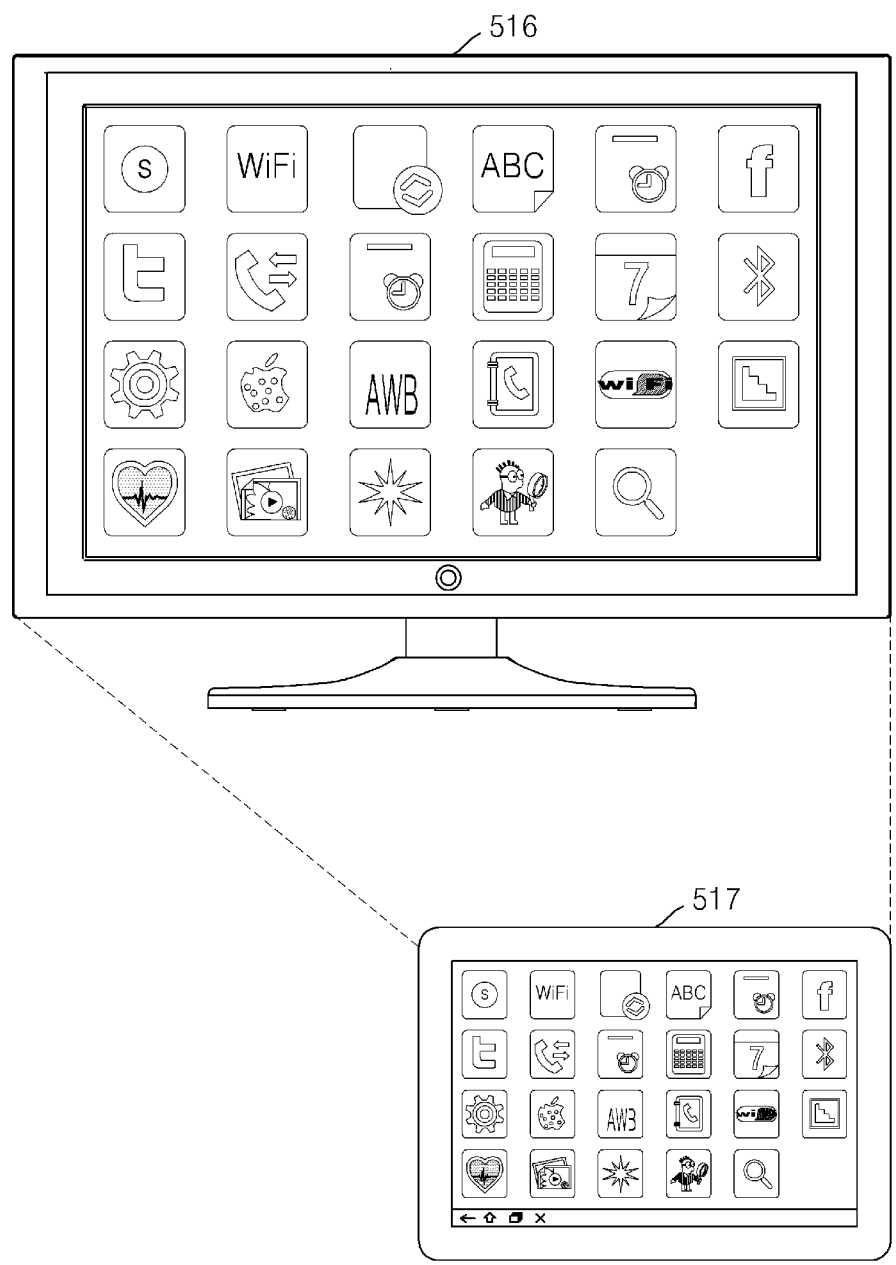

When the user selects 'erase' on the UI screen 513_1, the screen 513 displayed on the touch screen 203 of FIG. 5B is changed to a screen 515 of FIG. 5C or a screen 517 of FIG. 5D, and a second arrangement based on the screen 515 or 517 is generated. The screen 515 of FIG. 5C is obtained by erasing the selected object. The screen 517 of FIG. 5D is obtained by erasing the selected object and shifting a display position of each object to fill a display position of the erased object. In other words, the array of displayed objects may be rearranged following deletion of the selected object. The information on the new second arrangement of the objects may be correspondingly edited by the portable device 110, such that the information may be transmitted to the display device 120 for replication thereon. The information may be transmitted to the display device 120 for confirmation of the changes by a user, before editing is completed on the display device 120, and thus the user may preview the changes on the display device 120 and require confirmation from the display device 120 prior to completion of the editing on the display device 120. The new arrangement may be populated to the display device, as shown in screens 514 and 516.

The following UI may be modified using editing function of a touch screen-based device, but is not limited to that of FIGS. 5A through 5D.

Figure 6:
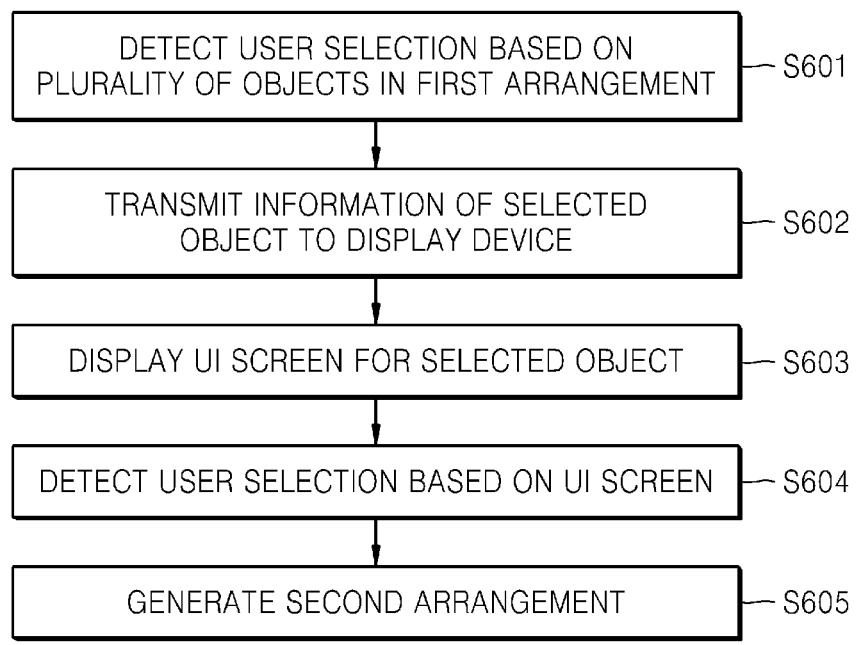
FIG. 6 is a flowchart illustrating a process of generating a second arrangement of the method of FIG. 4, according to an exemplary embodiment.

FIG. 6 is a flowchart illustrating a process of generating a second arrangement, according to an exemplary embodiment.

In operation S601, the processor 210 detects the user's selection based on an image of a plurality of objects in a first arrangement through the touch screen 203. The user's selection may be based on a touch, but may be performed based on the user's various gestures or by using a hardware button of the user input unit 201.

In operation S602, the processor 210 transmits information of an object selected by the user to the display device 120 and 121 through the communication unit 208. Accordingly, the display device 120 and 121 may display information of the selected object, as shown on the screen 512 of FIG. 5B. That is, whenever an event concerning a displayed object occurs, the processor 210 may transmit event information about the event to the display device 120 and 121 through the communication unit 208. Alternatively, after an editing is completed, the processor 210 may only transmit information of a second arrangement to the display device 120 and 121 through the communication unit 208 and may not transmit the event information, as discussed above.

In operation S603, the processor 210 displays a UI screen for controlling screen editing for the selected object on the touch screen 203 of the portable device 110. That is, the processor 210 may display the UI screen, such as UI screen 513_1 of FIG. 5B. The UI screen may vary according to the selected object. The UI screen may be determined according to an editable function of the selected object. For example, a first object may be associated with a backup option or a hide option, or a set option for changing attributes of the object.

In operation S604, the processor 210 detects the user's selection on the UI screen 513_1 through the touch screen 203. In operation S605, the processor 210 generates a second arrangement according to a result of the detection. The second arrangement may be generated by modifying the information about the first arrangement, or may be new information indicating only the modification. According to the second arrangement, the screen displayed on the touch screen 203 of the portable device 110 may be changed to the screen 515 or the screen 517, but is not limited thereto.

When the item 'move' is selected in the UI screen 513_1 and a touch indicating the selection of the item 'move' is maintained while the selected object is dragged to another position, the screen displayed on the touch screen 203 may be changed into a screen that the selected object is moved to the position at which the dragging stops. Also, in a case of that the UI screen 513_1 is provided in an area of the touch screen 203 where any object is not displayed, and the item 'set' on the UI screen 513_1 is selected, the processor 210 may perform a task for setting a new object or an attribute of an existing object. Also, when the item 'backup' is selected in the UI screen 513_1, the processor 210 may store information regarding the selected object as backup information in the storage unit 207 of the portable device 110. The information regarding the selected object includes information that can be used to manipulate the selected object, but is not limited thereto.

In operation S404, the processor 210 transmits information of the second arrangement to the display device 120 and 121 through the communication unit 208. As discussed above, the information of the second arrangement may be modified by information of the first arrangement, or may only be information that indicates a change to the information of the first arrangement. Accordingly, at least one of the plurality of objects is edited by the display devices 120 and 121 and displayed by the displayed devices 120 and 121 based on the information of the second arrangement on the display unit 120. That is, an edited screen 514 of FIG. 5C or an edited screen 516 of FIG. 5D may be displayed on the display unit 120 based on the information of the second arrangement.

Figure 7:
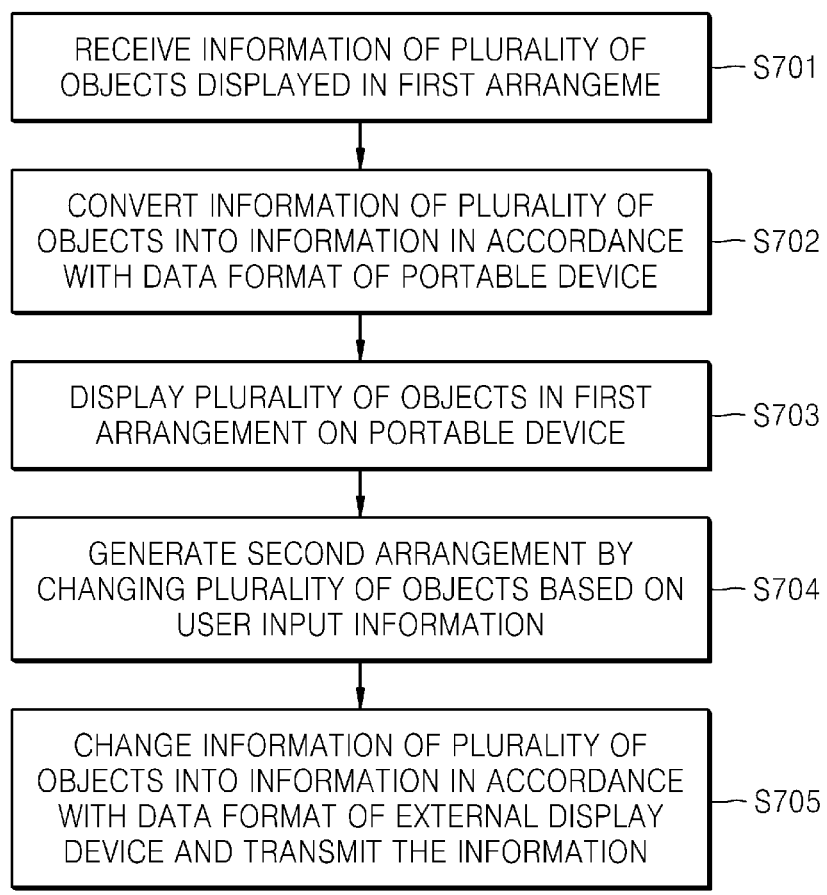
FIG. 7 is a flowchart illustrating an operation of the portable device in a method of controlling a screen editing of the display device, according to an exemplary embodiment.

FIG. 7 is a flowchart illustrating a method of controlling screen editing of the device devices 120 and 121, according to an exemplary embodiment. Although the method of FIG. 7 may be performed by each of the processors 210 and 211 of FIGS. 2A and 2B, the following will be explained on the assumption that the method is performed by the processor 210 for convenience of explanation.

FIG. 7 illustrates an example in which information about the plurality of objects is converted into formats suitable for interpretation by the portable devices 110 and 111 and display devices 120 and 121. Operations S701, S703, and S704 of FIG. 7 are similar to operations S401 through S403, and thus a redundant explanation thereof is omitted.

In operation S702, the processor 210 receives information from the display device 120 and 121 through the communication unit 208, and converts the information of the plurality of objects into information in accordance with a data format of each of the portable devices 110 and 111. Accordingly, as shown in FIG. 5A, the information of the plurality of objects in the first arrangement may be interpreted by the portable devices 110 and 111, and a screen displayed on the display device 120 and 121 may be replicated on the portable device 110 and 111.

In operation S705, the processor 210 converts information of the second arrangement into information in accordance with a data format of the display device 120 and 121 and transmits the converted information to the display device 120 and 121 through the communication unit 208. The information may be converted by the communication unit 208. Therefore, the information on the plurality of objects in the second arrangement may be interpreted by the display devices 120 and 121.

Figure 8:
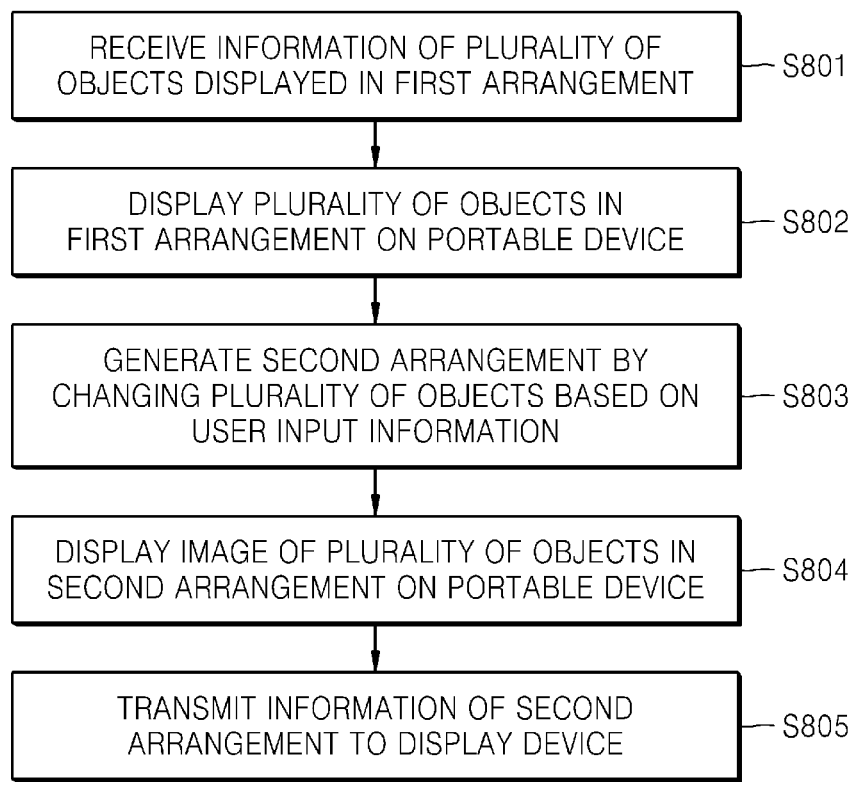
FIG. 8 is a flowchart illustrating a method of controlling screen editing of the display device, according to an exemplary embodiment.

FIG. 8 is a flowchart illustrating a method of controlling screen editing of the display device 120 and 121, according to an exemplary embodiment. FIG. 8 illustrates an example where a function of displaying a plurality of objects in a second arrangement on each of the portable devices 110 and 111 is added to the method of FIG. 4.

Operations S801 through S803 and operation S805 of FIG. 8 are similar to operations S401 through S403 and operation S404, and thus a redundant explanation thereof is omitted.

In operation S803, the processor 210 generates a second arrangement. In operation S804, the processor 210 displays the plurality of objects in the second arrangement on the touch screen 203 of the portable device 110 and 111. That is, the processor 210 displays the screen 515 of FIG. 5C or the screen 517 of FIG. 5D including the plurality of objects in the second arrangement.

Figure 9:
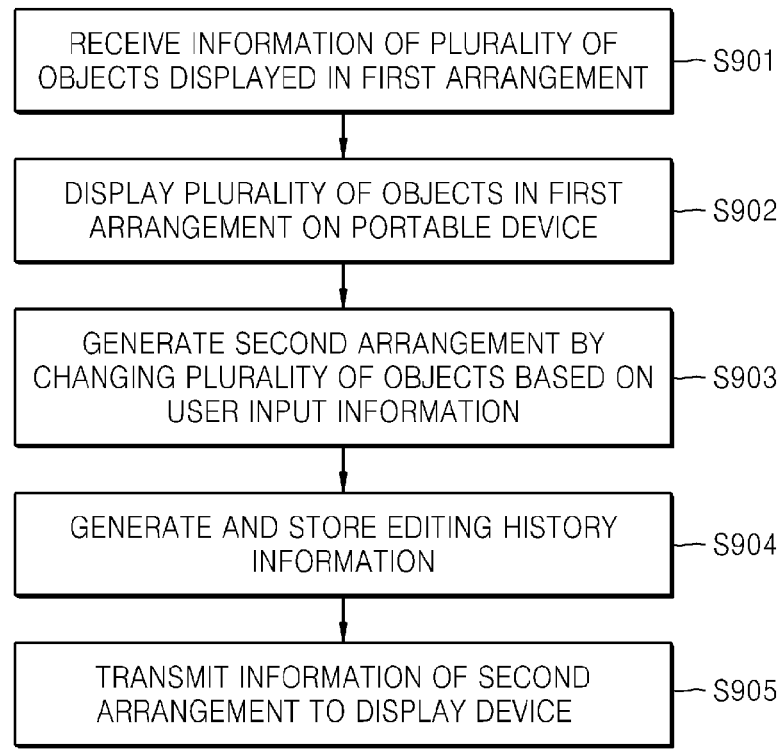
FIG. 9 is a flowchart illustrating method of controlling screen editing of the display device, according to an exemplary embodiment.

FIG. 9 is a flowchart illustrating a method of controlling screen editing of the display device 120 and 121, according to an exemplary embodiment. FIG. 9 illustrates an example where an operation of storing editing history information is added to the method of FIG. 4. Operations S901 through S903 and operation S905 of FIG. 9 are similar to operations S401 through S404 of FIG. 4, and thus a redundant an explanation thereof is omitted.

In operation S903, the processor 210 generates a second arrangement. In operation S904, the processor 210 generates editing history information of the second arrangement and stores the editing history information in the storage unit 207. The editing history information may indicate differences between the first arrangement and the second arrangement, and the differences may be associated with an editing date or time. In this case, the processor 210 may transmit the editing history information to the display device 120 and 121 through the communication unit 208 and share the editing history information with the display device 120 and 121.

Figure 10:
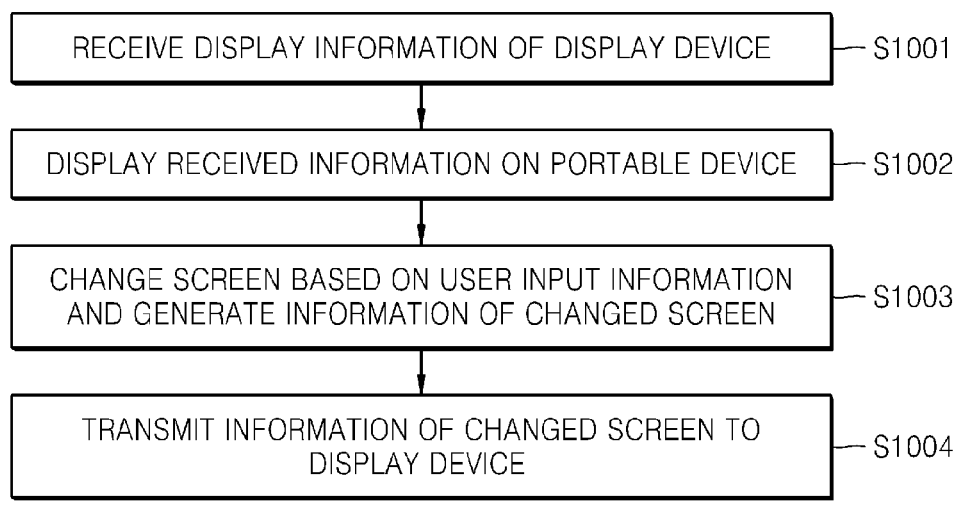
FIG. 10 is a flowchart illustrating a method of controlling screen editing of the display device, according to an exemplary embodiment.

FIG. 10 is a flowchart illustrating a method of controlling a screen editing of the display device 120 and 121, according to an exemplary embodiment. FIG. 10 illustrates an example where information of a display screen of the display device 120 and 121 is received, instead of information of a plurality of objects.

That is, in operation S1001, the processor 210 receives information of a display screen of the display device 120 and 121 through the communication unit 208. The portable devices 110 and 111 may transmit a display information request signal that requests the displayed information to the display device 120 and 121, and receive the information of the display screen from the display device 120 and 121 in response to the request. To this end, each of the portable devices 110 and 111 may select a screen editing control menu of a screen editing control application or a remote control application of the display device 120 and 121 as described in operation S401 of FIG. 4.

In operation S1002, the processor 210 displays the received information on the touch screen 203 of the portable device 110 and 111. In operation S1003, when user input information is detected through the touch screen 203 to adjust the displayed information, the processor 210 changes the screen based on the detected user input information to obtain a changed screen and generates information of the changed screen. A process of changing the screen to obtain the changed screen and generating the information of the changed screen may be performed in a manner similar to that used to generate a second arrangement.

In operation S1004, the processor 210 transmits the information of the changed screen to the display device 120 and 121 through the communication unit 208. Accordingly, the display device 120 and 121 edits and displays the edited screen.

Figure 11:
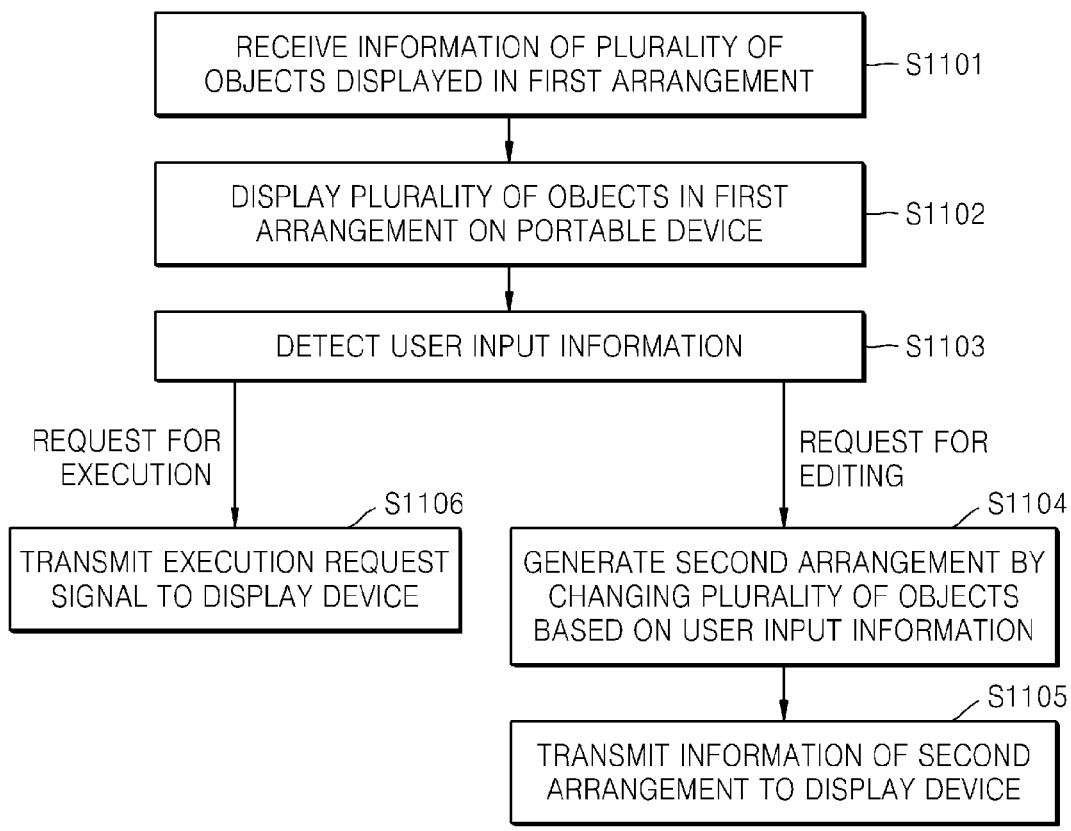
FIG. 11 is a flowchart illustrating a method of controlling a screen editing and a function of the display device, according to an exemplary embodiment.

FIG. 11 is a flowchart illustrating a method of controlling screen editing and a function of each of the display device 120 and 121, according to an exemplary embodiment. The method of FIG. 11 may be performed by the processor 210.

Operations S1101, S1102, S1104, and S1105 of FIG. 11 are similar to operations S401, S402, S403, and S404 of FIG. 4, and thus a redundant explanation thereof is omitted.

In operation S1103, user input information is detected through the touch screen 203, and when the detected user input information is an editing request for editing the screen displayed on the touch screen 203, the processor 210 proceeds to operations S1104 and S1105.

In operation S1103, the user input information is detected through the touch screen 203, and when the detected user input information is an execution request to execute at least one object included in the screen displayed on the touch screen 203, the processor 210 proceeds to operation S1106. In operation S1106, the processor 210 transmits an execution request signal to the display device 120 and 121 through the communication unit 208. Accordingly, the display device 120 and 121 executes the selected object. The selected object may be referred to as a selected screen information. When the selected object is a motion picture, the display device 120 and 121 reproduces the motion picture according to the received execution request signal.

Figure 12:
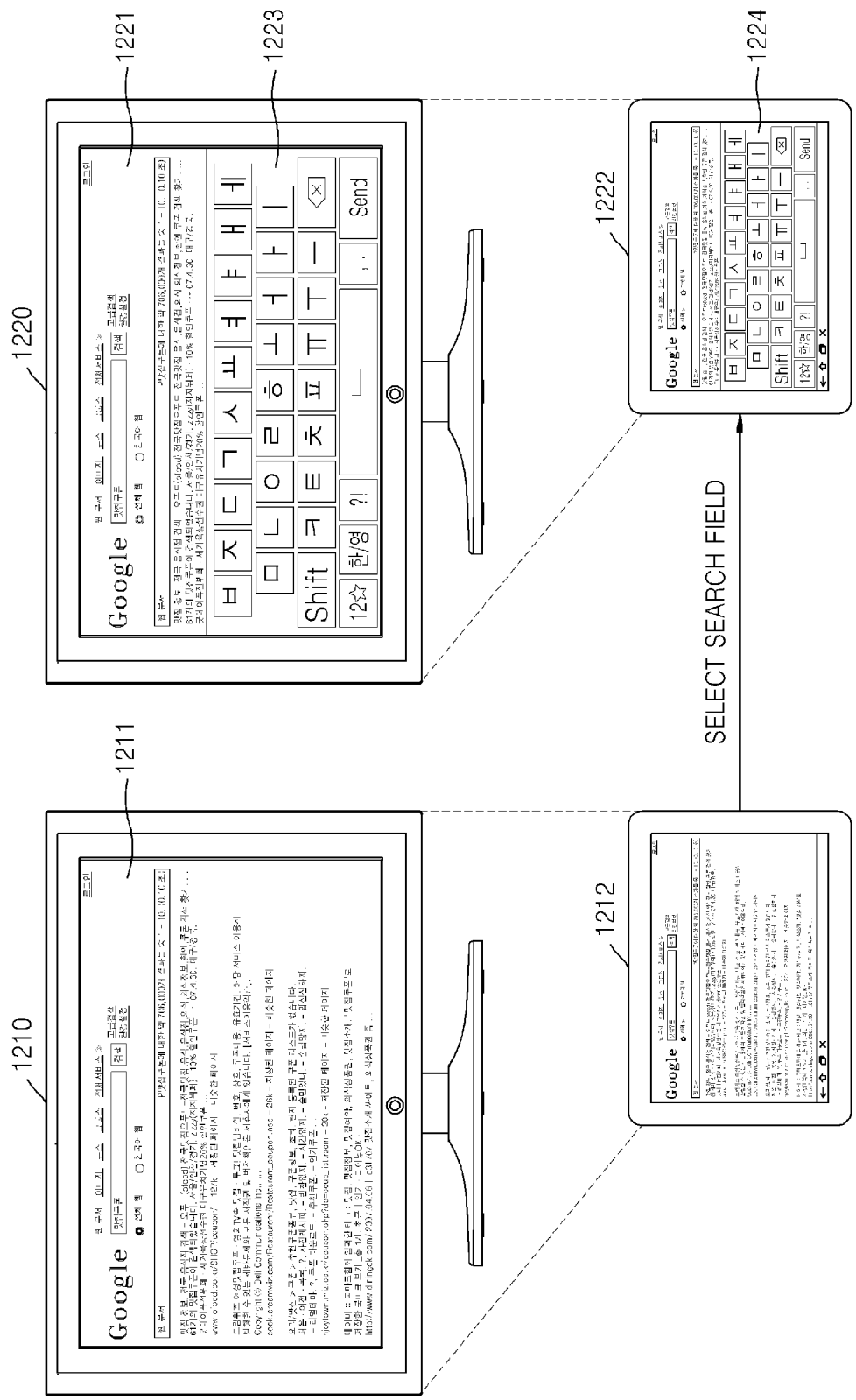
FIG. 12 is a view illustrating controlling a function of a display device.

That is, a function of the display device 120 and 121 may be controlled as shown in FIG. 12. FIG. 12 illustrates a screen for controlling a function of the display device 120 and 121. Assuming that a web page screen 1210 is displayed on the display device 120 and 121 and a screen 1212 is displayed on the touch screen 203 of the portable device 110 and 111, as shown in FIG. 12, when a search field window displayed on the touch screen 203 of the portable device 110 and 111 is touched, and data is entered into the search field window, keywords 1224 are displayed on a screen 1222, information of the keywords 1224 is transmitted to the display device 120 and 121, and a window 1221, which is the same as the screen 1222 and includes keywords 1223, is displayed on the screen 1220 of the display device 120 and 121. When information is input using the portable device 110 and 111, information of the keywords is transmitted to the display device 120 and 121 and a corresponding task may be performed when a search is requested.

Figure 13:
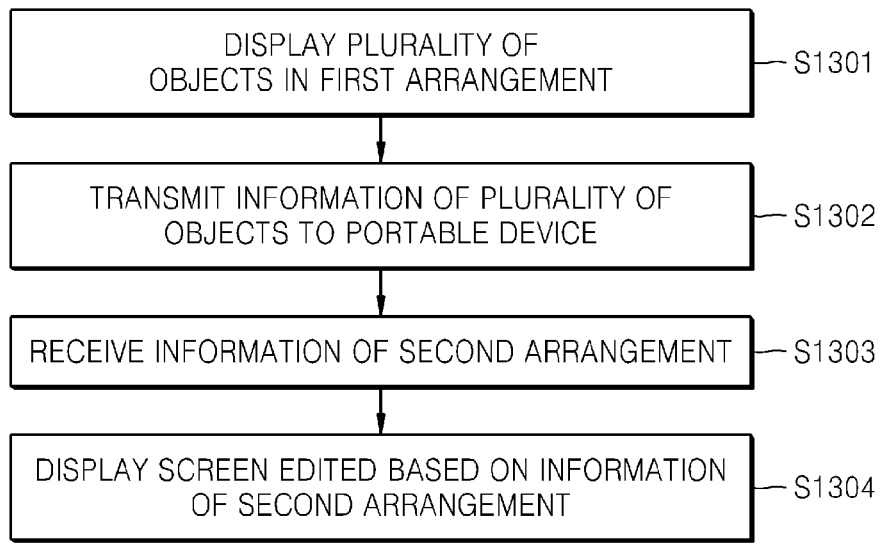
FIG. 13 is a flowchart illustrating a method of controlling screen editing of the display device, according to an exemplary embodiment.

FIG. 13 is a flowchart illustrating a method of controlling a screen editing and a function of the display device 120 and 121, according to an exemplary embodiment. The operation of FIG. 13 is performed by the processor 305 of FIG. 3.

In operation S1301, the processor 305 displays a plurality of objects in a first arrangement on the display unit 307. In operation S1302, the processor 305 transmits information of the plurality of objects to the portable device 110 and 111 through the communication unit 302. The transmission may be performed in response to a display information request signal of the portable device 110 and 111. The plurality of objects, which are displayed, may be a plurality of objects associated with the user. Accordingly, if the user of the display device 120 and 121 is another user, the plurality of objects displayed on the display unit 307 may be to a different set of objects associated with the different user.

In operation S1303, the processor 305 receives information of a second arrangement of the plurality of objects from the portable device 110 and 111 through the communication unit 302.

In operation S1304, when the information of the second arrangement is received, the processor 305 displays the plurality of objects on the display unit 307 in the second arrangement based on the information of the second arrangement. As discussed above, the processor 305 may edit the information of the first arrangement based on a difference between the first arrangement and the second arrangement, or may receive the information of the second arrangement.

Figure 14:
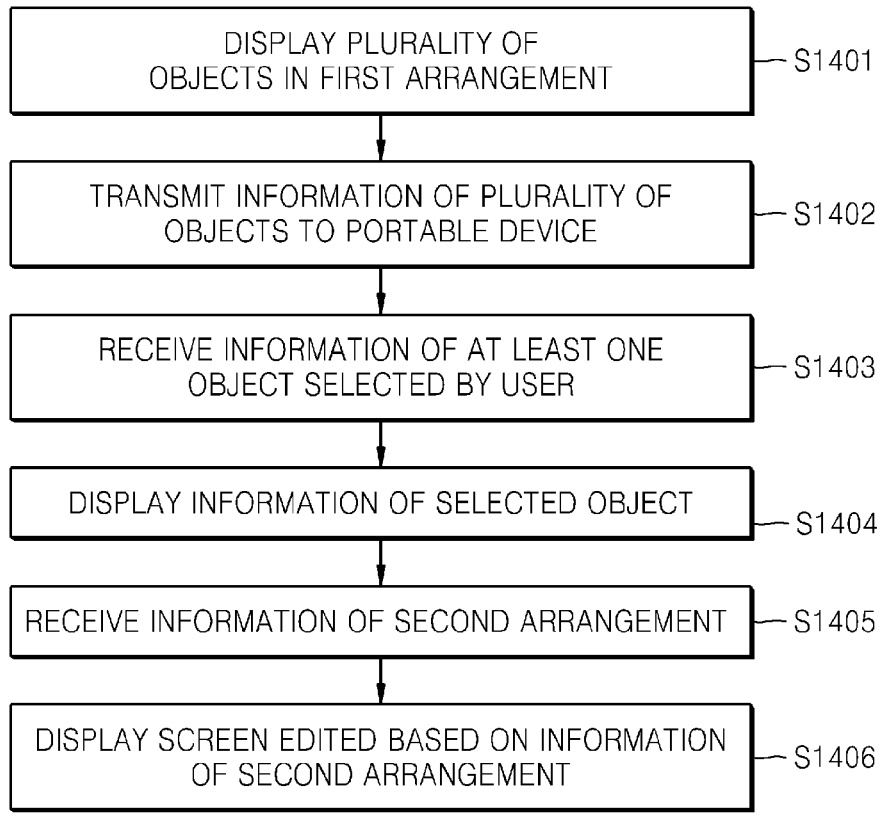
FIG. 14 is a flowchart illustrating a method of controlling screen editing of the display device, according to an exemplary embodiment.

FIG. 14 is a flowchart illustrating a method of controlling screen editing of the display device 120 and 121, according to an exemplary embodiment. FIG. 14 illustrates an example where a function of displaying information indicating an object selected by the portable device 110 and 111 on a screen is added to the operation of FIG. 13. Accordingly, operations S1401, S1402, S1405, and S1406 of FIG. 14 are similar to operations S1301 through S1304, and thus a redundant explanation thereof is omitted.

In operation S1403, the processor 305 receives information of at least one object selected by the user of the portable device 110 and 111 through the communication unit 302. Accordingly, in operation S1404, the processor 305 displays information indicating the selection of object from among the plurality of objects displayed in the first arrangement on the display unit 307. For example, the selected object may be highlighted or enlarged on the display 307, indicating selection of the object.

Figure 15:
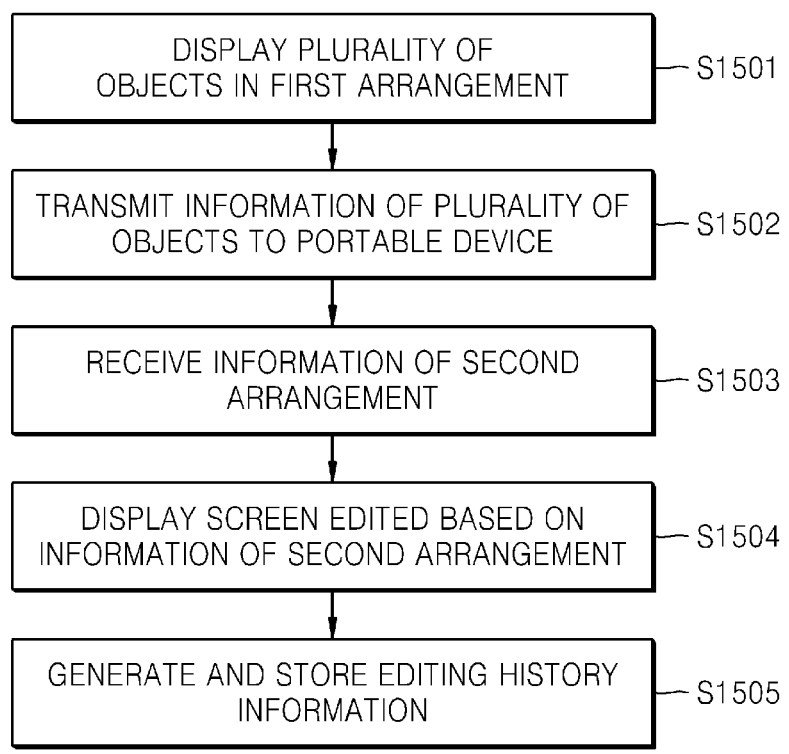
FIG. 15 is a flowchart illustrating a method of controlling screen editing of the display device, according to an exemplary embodiment.

FIG. 15 is a flowchart illustrating a method of controlling screen editing of the display device 120 and 121, according to an exemplary embodiment. FIG. 15 illustrates an example where a function of generating and storing editing history information is added to the operation of FIG. 13. Accordingly, operations S1501 through S1504 of FIG. 15 are similar to operations S1301 through S1304, and thus a redundant explanation thereof is omitted.

In operation S1504, a screen displayed on the display unit 307 is edited. In operation S1505, the processor 305 generates editing history information and stores the editing history information in the storage unit 304. In this case, the processor 305 may transmit the editing history information to the portable device 110 and 111 through the communication unit 302 and share the editing history information with the portable device 110 and 111.

In operation S1505, the processor 305 may store the editing history information to be managed according to displayed information. For example, when a displayed screen is an application browsing screen, the editing history information is stored as editing history information of application browsing. For example, application icons may be arranged or modified, and the history of editing the application icons may be stored. Also, when the displayed screen is a contents browsing screen, the editing history information is stored as editing history information of contents browsing. For example, content icons or thumbnails may be arranged or modified, and the history of editing the content icons may be stored. Alternatively, the processor 305 may store the editing history information to be managed according to the displayed information.

Figure 16:
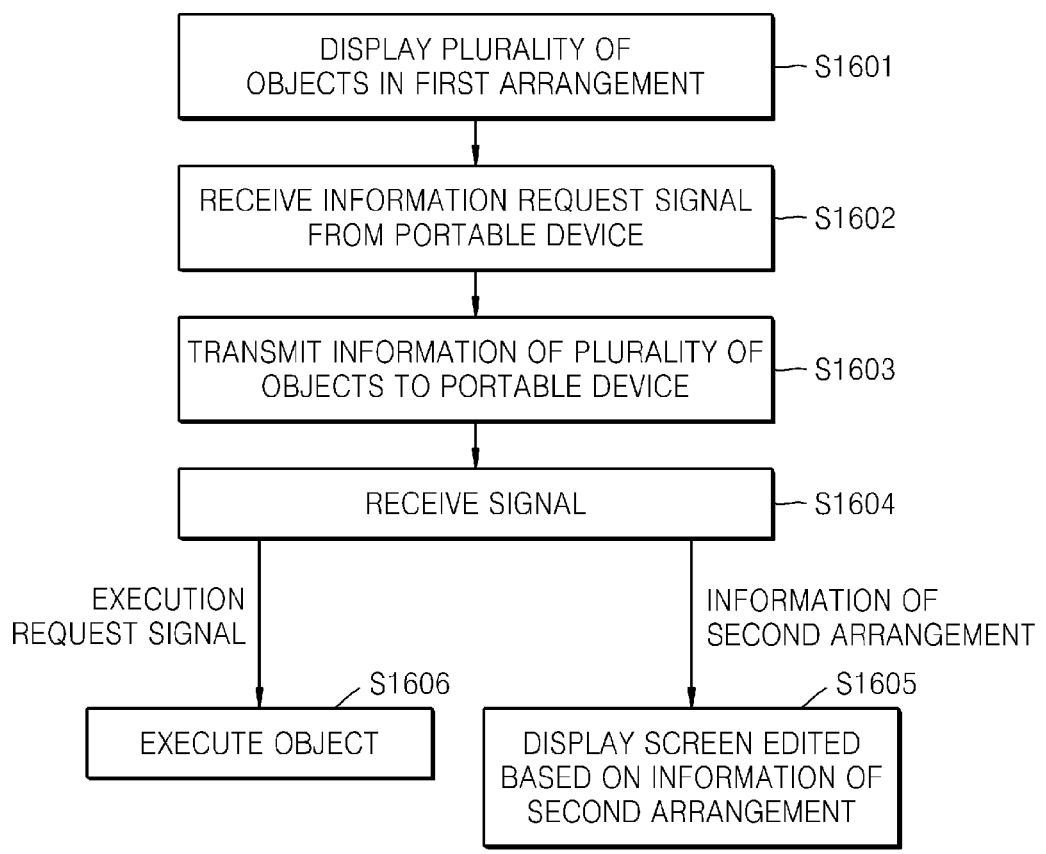
FIG. 16 is a flowchart illustrating a method of controlling screen editing of the display device, according to an exemplary embodiment.

FIG. 16 is a flowchart illustrating a method of controlling screen editing of the display device 120 and 121, according to an exemplary embodiment.

In operation S1601, the plurality of objects are displayed in a first arrangement. In operation S1602, an information request signal is received from the portable device 110 requesting the information about the plurality of displayed objects. In operation S1603, the information on the plurality of objects displayed in the first arrangement is transmitted to the portable device 110, in response to receiving the information request signal.

In operation S1604, the processor 305 receives a signal from the portable device 110 and 111 through the communication unit 302. When the received signal is information of a second arrangement, the processor 305 displays the plurality of objects on the display unit 307 in the second arrangement based on the information of the second arrangement in operation S1605.

On the other hand, when the signal received through the communication unit 302 is an execution request signal for the selected object, the processor 305 proceeds to operation S1606 and the processor 305 executes the selected object.

Figure 17:
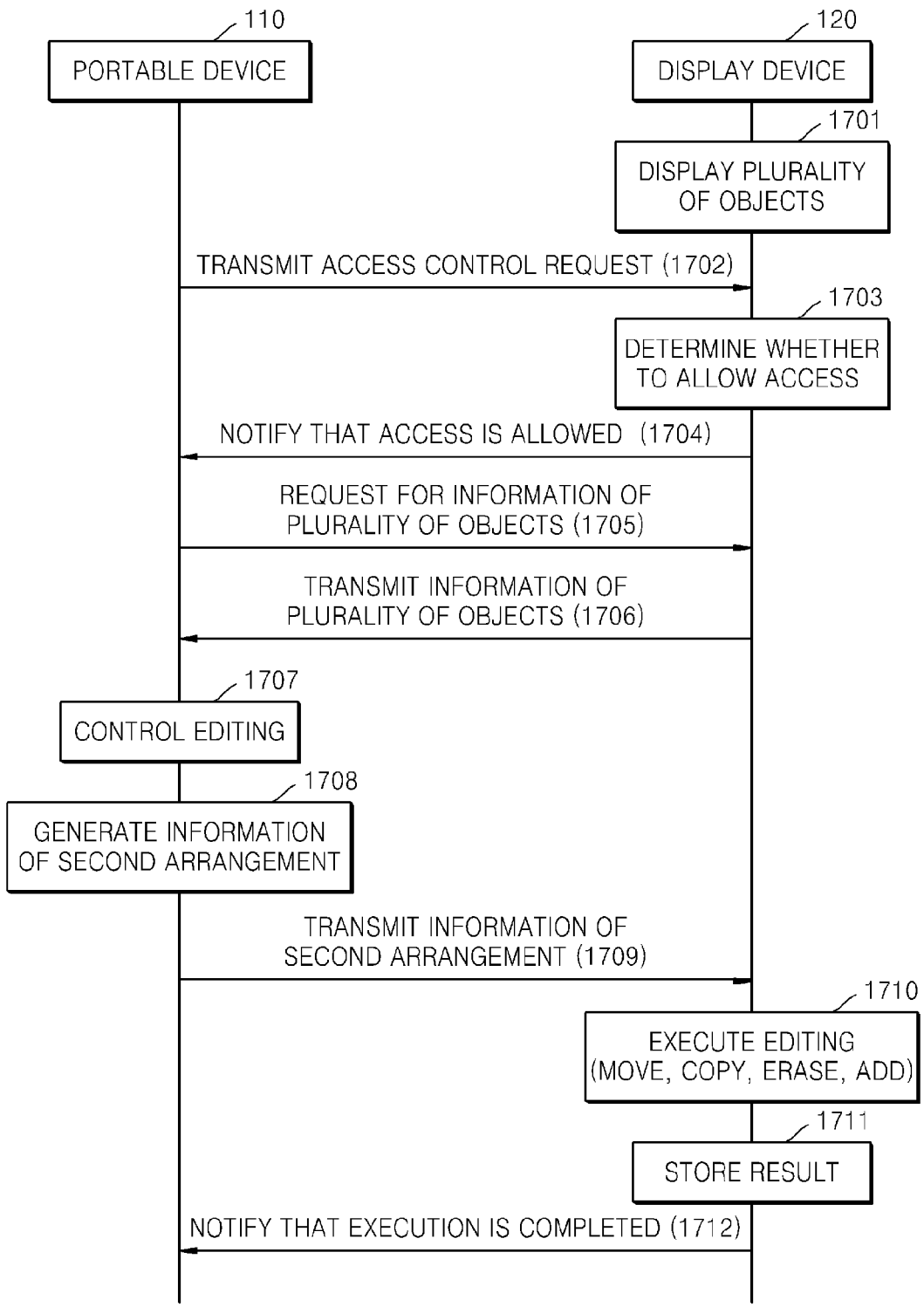
FIG. 17 is a flowchart illustrating a method of controlling screen editing of the display device, according to an exemplary embodiment.

FIG. 17 is a flowchart illustrating a method of controlling screen editing of the display device, according to an exemplary embodiment.

In operation 1701, the display device 120 displays a plurality of objects on the display unit 307. In operation 1702, the portable device 110 transmits an access control authorization request signal to the display device 120 through the communication unit 208. In operation 1703, the display unit 120 determines whether to allow access of the portable device 110. The access control may be an authentication process based on information of the portable device 110 stored in the storage unit 207.

If it is determined to allow access of the portable device 110, the method proceeds to operation 1704. In operation 1704, the display device 120 notifies the portable device 110 that the access is allowed through the communication unit 302.

In operation 1705, the portable device 110 requests the display device 120 for information of a plurality of objects displayed on the display device 120. In operation 1706, the display device 120 transmits the information of the plurality of objects to the portable device 110.

In operation 1707, the portable device 110 edits the plurality of objects. The editing may be performed as described with reference to FIGS. 5A through 5D.

In operation 1708, the portable device 110 generates information of a second arrangement, based on a result of the editing. In operation 1709, the portable device 110 transmits the information of the second arrangement to the display device 120. In operation 1710, the display device 120 correspondingly edits the plurality of objects displayed on the display unit 307. Next, in operation 1711, the display device 120 stores a result of the editing in the storage unit 304. In operation 1712, the display device 120 notifies the portable device 110 that the editing is completed.

Figure 18:
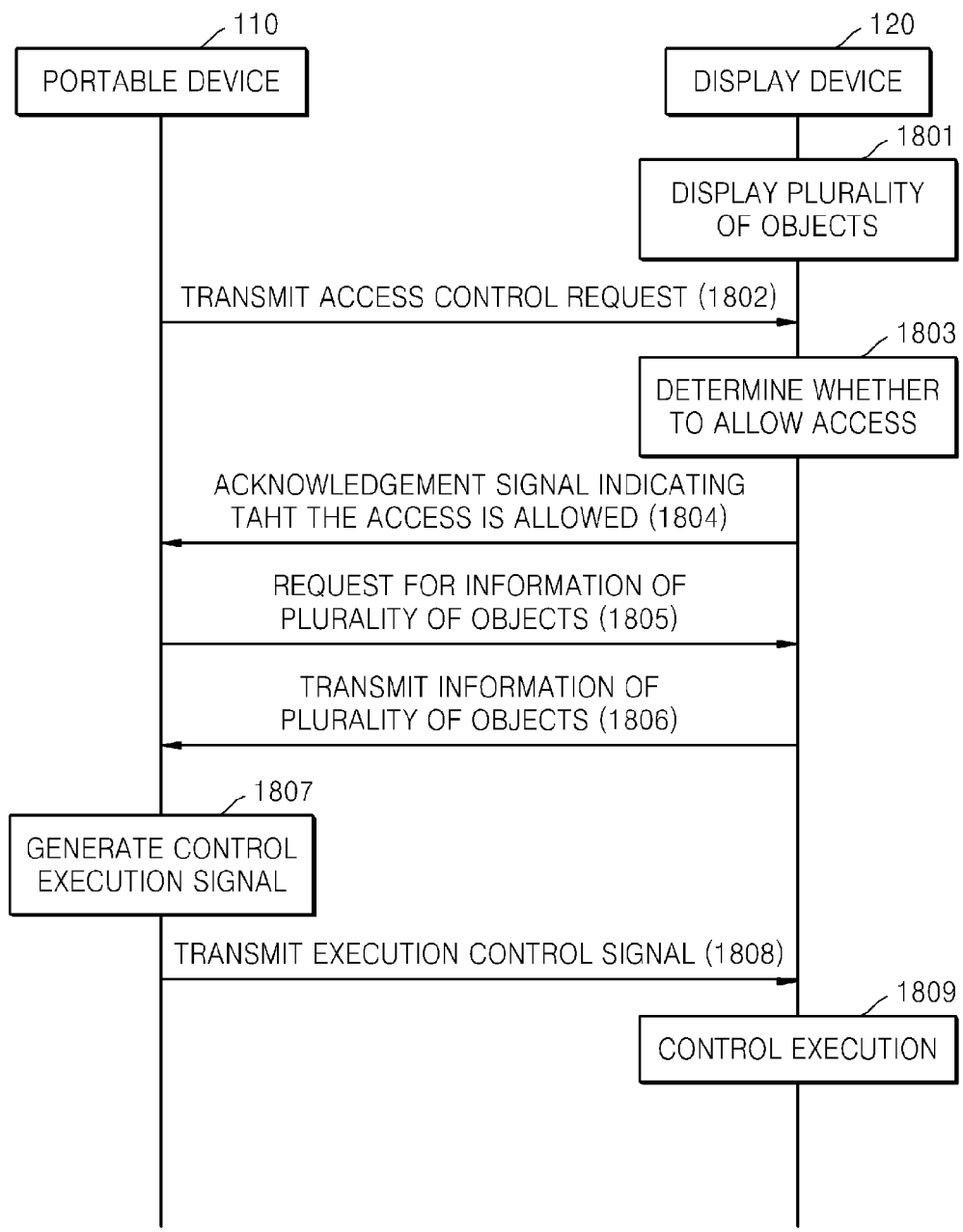
FIG. 18 is a flowchart illustrating a method of executing a function of the display device, according to an exemplary embodiment.

FIG. 18 is a flowchart illustrating a method of executing a function of the display device 120, according to an exemplary embodiment.

Referring to FIG. 18, in operation 1801, the display device 120 displays a plurality of objects. In operation 1802, the portable device 110 transmits an access control authorization request signal to the display device 120. In operation 1803, the display device 120 determines whether to allow access to the portable device, similar to operation 1703 of FIG. 17.

In operation 1804, the display device 120 transmits an acknowledgement signal indicating that the access is allowed to the portable device 110. In operation 1805, the portable device 110 requests the display device 120 for information about objects displayed on the display device 120.

In operation 1806, the display device 120 transmits the information about the objects to the portable device 110. In operation 1807, the portable device 110 generates an execution control signal for execution of at least one selected displayed object. In operation 1808, the portable device 110 transmits the execution control signal to the display device 120 to execute the at least one selected displayed object. Accordingly, in operation 1809, the display device 120 executes the selected object.

Figure 19:
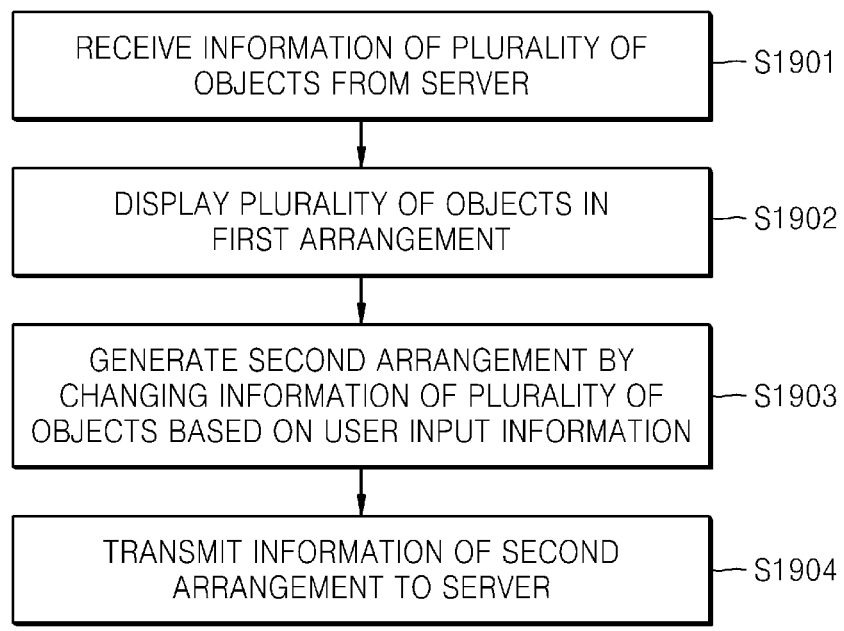
FIG. 19 is a flowchart illustrating a method of controlling screen editing of the display device, according to an exemplary embodiment.

FIG. 19 is a flowchart illustrating a method of controlling screen editing of the display device 120 using the portable device 110, according to an exemplary embodiment. The method of FIG. 19 is performed by the processor 210.

In operation S1901, the processor 210 receives information of a plurality of objects displayed in a first arrangement on the display device 120 from the server 130 through the communication unit 208.

In operation S1902, the processor 210 displays the plurality of objects in the first arrangement based on the information of the plurality of objects received from the server 130.

In operation S1903, the processor 210 generates a second arrangement by changing the information of the plurality of objects based on detected user input information. In operation S1904, the processor 210 transmits information of the second arrangement through the communication unit 208 to the server 130.

Figure 20:
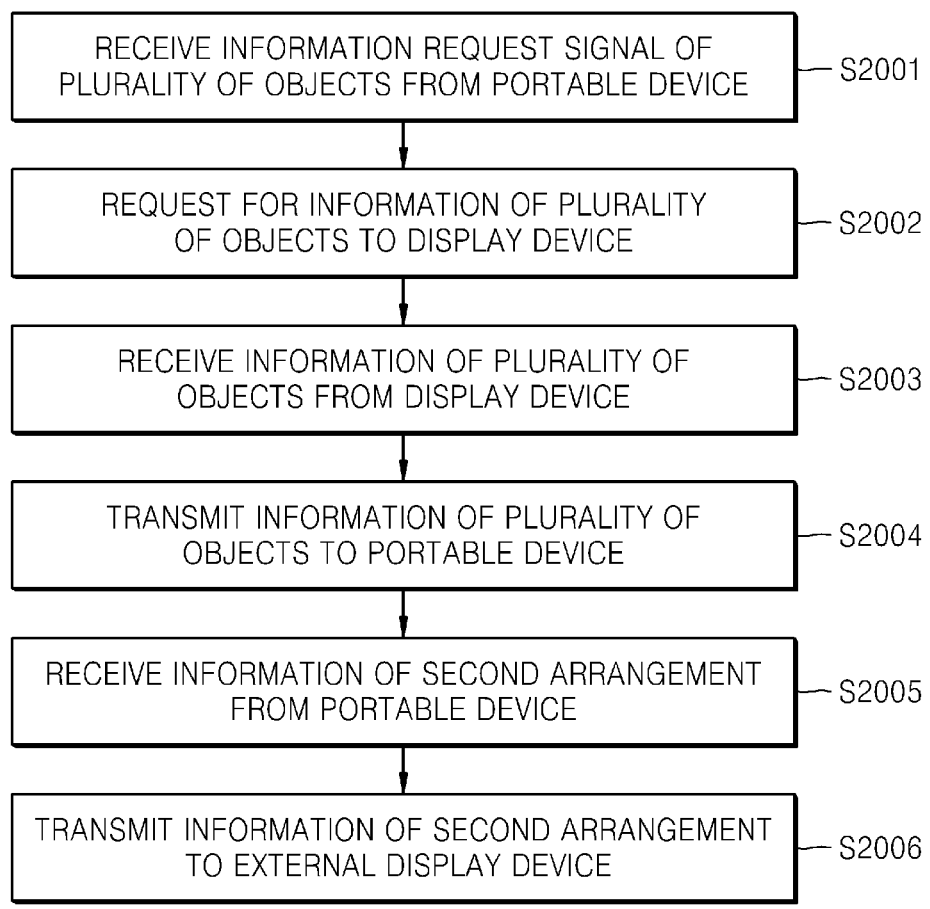
FIG. 20 is a flowchart illustrating a method of controlling screen editing of the display device using a server, according to an exemplary embodiment.

FIG. 20 is a flowchart illustrating a method of controlling screen editing of the display device 120, according to an exemplary embodiment. The method of FIG. 20 is performed by the processor 133 of FIG. 1A.

In operation S2001, the communication unit 131 receives from the portable device 110 an information request signal for information about objects displayed on the display device 120. Information for communicating with the display device 120 is included in the information request signal. The information for communicating with the display device 120 may include identification information of the display device 120 or an address of the display device 120, such as an Internet Protocol (IP) address. In operation S2002, the processor 133 requests the display device 120 for information on objects displayed on the display device 120 through the communication unit 131 using the information for communicating with the display device 120 included in the information request signal received in operation S2001.

In operation S2003, the information of the plurality of objects displayed in a first arrangement is received from the display device 120 through the communication unit 131. In operation S2004, the processor 133 transmits the information of the plurality of objects to the portable device 110 through the communication unit 131. In operation S2005, information of a second arrangement of the information of the plurality of objects is received from the portable device 110 through the communication unit 131. In operation S2006, the processor 133 transmits the information of the second arrangement to the display device 110 through the communication unit 131.

The server 130 may classify the information of the plurality of objects displayed on the display device 120 in association with user information and store and manage the associated information in the storage unit 132. In this case, when the information of the plurality of objects displayed on the display device 120 is not information of a plurality of objects only for the user of the portable device 110, the user of the portable device 110 may request the server 130 to display the information of the plurality of objects only for the user on the display device 120. That is to say, user-specific information may be displayed, such as objects associated with only the user. The user-specific information may be determined according to an identification of a user, or an identification of the portable device 110 associated with the user.

According to the request, the server 130 transmits the information of the plurality of objects only for the user of the portable device 110, which is stored in the server 130, to the display device 120 and the portable device 110. Accordingly, the portable device 110 and the display device 120 simultaneously display the information of the plurality of objects received from the server 130.

The portable device 110 displays the information of the plurality of objects and controls screen editing or a function based on the information of the plurality of objects. A result of the control of the screen editing or the function may be transmitted to the display device 120 through the server 130 or may be directly transmitted from the portable device 110 to the display device 120 whenever a control event occurs or an editing operation is completed.

The display device 120 edits a screen according to a screen editing control signal or controls a function of the displayed objects according to a function control signal.

Figure 21:
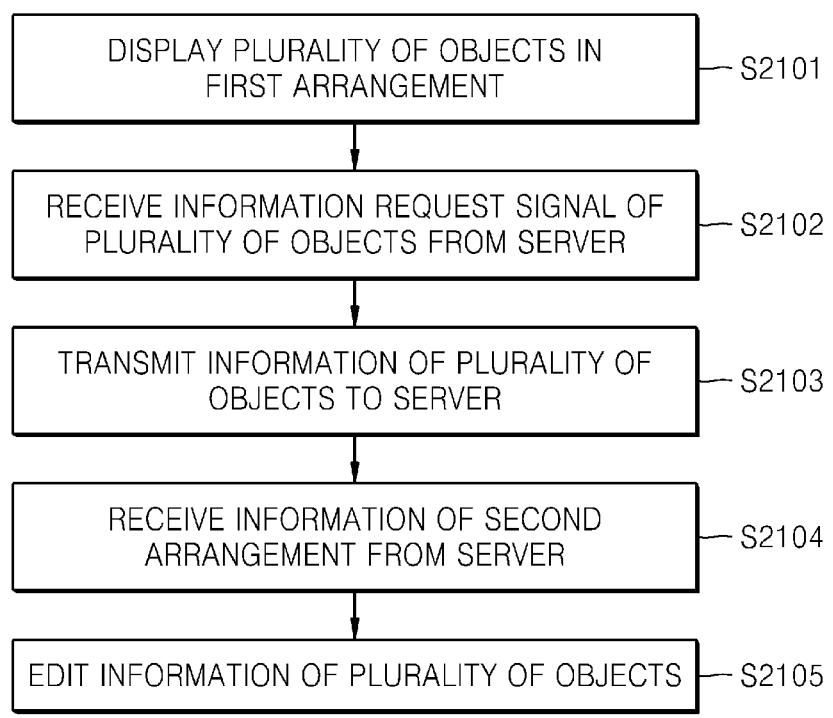
FIG. 21 is a flowchart illustrating a method of controlling screen editing of the display device, according to an exemplary embodiment.

FIG. 21 is a flowchart illustrating a method of controlling screen editing of the display device 120, according to an exemplary embodiment. The method of FIG. 21 is performed by the processor 305.

In operation S2101, a plurality of objects are displayed in a first arrangement by the processor 305. In operation S2102, the processor 305 receives a request signal for displayed information from the server 130 through the communication unit 302. In operation S2103, the processor 305 transmits information of the displayed plurality of objects to the server 130.

Next, in operation S2104, information of a second arrangement is received from the server 130 through the communication unit 302. In operation S2105, the processor 305 displays a screen obtained by editing at least one of the plurality of objects displayed on the display unit 307 based on the information of the second arrangement.

FIG. 22 is a flowchart illustrating a method of controlling screen editing of the display device 120, according to an exemplary embodiment.

In operation 2201, the display device 120 displays a plurality of objects. In operation 2202, the portable device 110 transmits an access control authorization request signal to the server 130.

The plurality of objects displayed on the display device 120 may be a plurality of objects only for the user of the portable device 110 provided by the server 130. That is, the objects may be user-specific objects.

In operation 2203, the server 130 determines whether to allow access by the portable device 110. The determining may be performed based on information of the portable device 110. The information of the portable device 110 may include identification information of the portable device 110 and/or user information of the portable device 110.

If it is determined that the access is allowed, the method proceeds to operation 2207. In operation 2207, the server 130 may notify the portable device 110 that the access is allowed. However, t access control may instead be performed by the display device 120.

In operation 2204, the server 130 relays the access control authorization request signal to the display device 120. In operation 2205, the display device 120 determines whether to allow access. In operation 2206, the display device 120 notifies the server 130 that the access is allowed. In operation 2207, the server 130 may notify the portable device 110 that the access is allowed.

In operation 2208, the portable device 110 transmits an information request signal to the server 130. In operation 2209, the server 130 relays the information request signal of the plurality of objects to the display device 120. The information request signal for information on the plurality of objects may be referred to as a display information request signal.

In operation 2210, the display device 120 transmits information of the plurality of objects, which are currently displayed on the display device 120, to the server 130. In operation 2211, the server 130 transmits the information of the plurality of objects received from the display device 120 to the portable device 110.

In operation 2212, the portable device 110 performs screen editing. In operation 2213, the portable device 110 transmits a control command to the server 130 corresponding to the screen editing, such as the information about the second arrangement of the objects.

In operation 2214, the server 130 converts the control command into a control command having a data format that may be processed by the display device 120. In operation 2215, the server 130 transmits the converted control command to the display device 120. In operation 2216, the display device 120 executes editing according to the converted control command received from the server 130. In operation 2217, when the editing is completed, the display device 120 displays an edited screen and transmits an editing completion message to the server 130. In operation 2218, the server 130 stores a result and transmits an execution completion notification message to the portable device 110 in operation 2219. The stored result may include history information according to the editing. The server 130 may transmit the editing history information to the portable device 110 and/or the display device 120 to share the editing history information with the portable device 110 and/or the display device 120.

At least one program including commands for performing a method of controlling a screen editing of a display device, according to the one or more exemplary embodiments, may be embodied as computer-readable codes on a computer-readable recording medium. The computer-readable recording medium includes any storage device that may store data that may be read by a computer system. Examples of the computer-readable recording medium include read-only memories (ROMs), random-access memories (RAMs), CD-ROMs, magnetic tapes, floppy disks, and optical data storage devices. The computer-readable recording medium may be distributed over network-coupled computer systems so that the computer-readable codes are stored and executed in a distributed fashion.

While the exemplary embodiments have been particularly shown and described, the exemplary embodiments and terms have merely been used to provide a complete understanding of the disclosure and should not be construed as limiting. The exemplary embodiments should be considered in a descriptive sense only and not for purposes of limitation. Therefore, the scope of the inventive concept is defined not by the detailed description but by the appended claims, and all differences within the scope will be construed as being included.

What is claimed is:

1. A method for controlling a display device by a portable device, the method comprising:
   requesting a server to display on a display of the display device a first arrangement of icons stored on the server, the first arrangement of icons associated with a user of the portable device;
   receiving first display information of the first arrangement of icons from the server in response to the requesting the server to display the first arrangement of icons on the display of the display device;
   displaying the first arrangement of icons on a display of the portable device based on the first display information, wherein the first arrangement of icons is displayed on the display of the display device when displaying the first arrangement of icons on the display of the portable device;
   modifying the first arrangement of icons displayed on the display of the portable device to generate a second arrangement of icons;
   generating second display information based on the second arrangement of icons; and
   transmitting to the display device a request to display the second arrangement of icons on the display of the display device, the request comprising the second display information.

2. The method of claim 1, wherein the first display information comprises display position information of the icons that indicates positions of the icons displayed on the display of the display device.

3. The method of claim 2, wherein the display position information comprises coordinate information that indicates absolute positions of the icons at coordinate positions displayed on the display of the display device with reference to coordinate positions of the display of the display device.

4. The method of claim 2, wherein the display position information comprises coordinate information that indicates relative positions of the icons relative to each other on the display of the display device.

5. The method of claim 2, wherein the first display information further comprises icon image data of the icons.

6. The method of claim 5, wherein the first display information is extensible markup language data.

7. The method of claim 2, wherein the second display information comprises the first display information modified to indicate new positions of the icons to be displayed on the display of the display device.

8. The method of claim 2, wherein the second display information comprises a difference between the first display information and new positions of the icons to be displayed on the display of the display device.

9. The method of claim 1, further comprising:
   displaying the second arrangement of icons on the display of the portable device while the display device displays the first arrangement of icons on the display of the display device.

10. The method of claim 1, wherein the modifying comprises:
    at least one of changing a position of at least one of the icons in the first arrangement of icons to be a new position of the at least one of the icons in the second arrangement of icons, deleting the at least one of the icons in the first arrangement of icons, adding a new icon to the icons in the first arrangement of icons.

11. The method of claim 10, wherein the first display information is extensible markup language (XML) data, and
    wherein the modifying comprises modifying the XML data based on the at least one of the changing, the deleting, and the adding.

12. The method of claim 1, wherein the modifying comprises:
    receiving an input on the display of the portable display that modifies an icon in the first arrangement of icons; and
    generating the second arrangement of icons based on the input.

13. The method of claim 1, wherein the icons comprise icons representing content to be reproduced by the display device and icons representing applications of the display device.

14. A portable device comprising:
    a display;
    a communication unit that communicates with at least one of a display device and a server; and
    a controller that requests the server to display on a display of the portable device a first arrangement of icons stored on the server, the first arrangement of icons associated with a user of the portable device, via the communication unit, receives first display information of the first arrangement of icons from the server via the communication unit in response to the requesting the server to display the first arrangement of icons on the display of the display device, controls the display to display the first arrangement of icons on the display based on the first display information, wherein the first arrangement of icons is displayed on the display device when displaying the first arrangement of icons on the display of the portable device, receives an input modifying the first arrangement of icons displayed on the display of the portable device, generates a second arrangement of icons based on the input, generates second display information based on the second arrangement of icons, and transmit to the display device a request to display the second arrangement of icons on the display of the display device via the communication unit, the request comprising the second display information.

15. The portable device of claim 14, wherein the first display information comprises display position information of the icons that indicates positions of the icons displayed on the display of the display device.

16. The portable device of claim 15, wherein the display position information comprises coordinate information that indicates absolute positions of the icons at coordinate positions displayed on the display of the display device with reference to coordinate positions of the display of the display device.

17. The portable device of claim 15, wherein the display position information comprises coordinate information that indicates relative positions of the icons relative to each other on the display of the display device.

18. The portable device of claim 15, wherein the first display information further comprises icon image data of the icons.

19. The portable device of claim 18, wherein the first display information is extensible markup language data.

20. The portable device of claim 15, wherein the second display information comprises the first display information modified to indicate indicates new positions of the icons to be displayed on the display of the display device.

21. The portable device of claim 15, wherein the second display information comprises a difference between the first display information and new positions of the icons to be displayed on the display of the display device.

22. The portable device of claim 14, wherein the controller controls the display to display the second arrangement of icons on the display of the portable device while the display device displays the first arrangement of icons on the display of the display device.

23. The portable device of claim 14, wherein the controller generates the second arrangement of icons by at least one of changing a position of at least one of the icons in the first arrangement of icons to be a new position of the at least one of the icons in the second arrangement of icons, deleting the at least one of the icons in the first arrangement of icons, adding a new icon to the icons in the first arrangement of icons.

24. The portable device of claim 23, wherein the first display information is extensible markup language (XML) data, and
wherein the controller modifies the XML data based on the at least one of the changing, the deleting, and the adding.

25. The portable device of claim 14, wherein the controller modifies the XML data by receiving an input on the display of the portable display that modifies an icon in the first arrangement of icons and generating the second arrangement of icons based on the input.

26. The portable device of claim 14, wherein the icons comprise icons representing content to be reproduced by the display device and icons representing applications of the display device.

27. A non-transitory computer-readable medium having recorded thereon a program that causes a portable device to execute a method for controlling a display device by a portable device, the method comprising:

requesting a server to display on a display of the display device a first arrangement of icons stored on the server, the first arrangement of icons associated with a user of the portable device;

receiving first display information of the first arrangement of icons from the server in response to the requesting a server to display a first arrangement of icons on a display of the display device;

displaying the first arrangement of icons on the display of the portable device based on the first display information, wherein the first arrangement of icons is displayed on the display of the display device when displaying the first arrangement of icons on the display of the portable device;

modifying the first arrangement of icons displayed on the display of the portable device to generate a second arrangement of icons;

generating second display information based on the second arrangement of icons; and transmitting to the display device a request to display the second arrangement of icons on the display of the display device, the request comprising the second display information.

* * * * *